United States Patent
El Allouche et al.

(10) Patent No.: US 10,948,615 B2
(45) Date of Patent: Mar. 16, 2021

(54) LAND SEISMIC SENSOR SPREAD WITH ADJACENT MULTICOMPONENT SEISMIC SENSOR PAIRS ON AVERAGE AT LEAST TWENTY METERS APART

(71) Applicant: WESTERNGECO LLC, Houston, TX (US)

(72) Inventors: Nihed El Allouche, Cambridge (GB); Ali Ozbek, Milton (GB)

(73) Assignee: WesternGeco L.L.C., Houston, TX (US)

( * ) Notice: Subject to any disclaimer, the term of this patent is extended or adjusted under 35 U.S.C. 154(b) by 343 days.

(21) Appl. No.: 15/780,223

(22) PCT Filed: Dec. 1, 2016

(86) PCT No.: PCT/US2016/064481
§ 371 (c)(1),
(2) Date: May 30, 2018

(87) PCT Pub. No.: WO2017/096081
PCT Pub. Date: Jun. 8, 2017

(65) Prior Publication Data
US 2019/0004198 A1    Jan. 3, 2019

Related U.S. Application Data

(60) Provisional application No. 62/261,934, filed on Dec. 2, 2015.

(51) Int. Cl.
*G01V 1/20* (2006.01)
*G01V 1/00* (2006.01)
(Continued)

(52) U.S. Cl.
CPC ............. *G01V 1/20* (2013.01); *G01V 1/003* (2013.01); *G01V 1/364* (2013.01); *G01V 1/184* (2013.01);
(Continued)

(58) Field of Classification Search
CPC .......... G01V 1/003; G01V 1/184; G01V 1/20; G01V 2210/3246
See application file for complete search history.

(56) References Cited

U.S. PATENT DOCUMENTS

| | | | |
|---|---|---|---|
| 3,860,928 A | | 1/1975 | Ehrlich |
| 4,020,447 A | * | 4/1977 | Michon ............ G01V 1/24 367/20 |

(Continued)

FOREIGN PATENT DOCUMENTS

| | | |
|---|---|---|
| CN | 1203324 C | 12/1998 |
| CN | 1227634 A | 9/1999 |

(Continued)

OTHER PUBLICATIONS

First Chinese Office Action issued in related Chinese Patent Application No. 2016800754152 dated Sep. 22, 2019, 10 pages.

(Continued)

*Primary Examiner* — Ian J Lobo
(74) *Attorney, Agent, or Firm* — Fletcher Yoder, P.C.

(57) ABSTRACT

A system and method for multicomponent noise attenuation of a seismic wavefield is provided. Embodiments may include receiving, at one or more computing devices, seismic data associated with a seismic wavefield over at least one channel of a plurality of channels from one or more seismic sensor stations. Embodiments may further include identifying a noise component on the at least one channel of the plurality of channels and attenuating the noise component on the at least one channel of the plurality of channels (Continued)

based upon, at least in part, the seismic data received from the one or more seismic sensor stations.

19 Claims, 9 Drawing Sheets

(51) Int. Cl.
  *G01V 1/36* (2006.01)
  *G01V 1/18* (2006.01)
  *G01V 1/28* (2006.01)

(52) U.S. Cl.
  CPC ...... *G01V 1/282* (2013.01); *G01V 2210/3246* (2013.01); *G01V 2210/3248* (2013.01); *G01V 2210/34* (2013.01); *G01V 2210/48* (2013.01)

(56) References Cited

U.S. PATENT DOCUMENTS

| | | | |
|---|---|---|---|
| 4,176,356 A | 11/1979 | Foster et al. | |
| 4,207,622 A | 6/1980 | Miller | |
| 4,213,132 A | 7/1980 | Davidson | |
| 4,636,956 A * | 1/1987 | Vannier | G01V 1/362 702/14 |
| 4,803,668 A * | 2/1989 | Berryhill | G01V 1/003 367/56 |
| 5,724,241 A | 3/1998 | Wood et al. | |
| 5,971,095 A | 10/1999 | Ozbek | |
| 6,182,014 B1 | 1/2001 | Kenyon et al. | |
| 6,651,007 B2 | 11/2003 | Ozbek | |
| 7,257,049 B1 | 8/2007 | Laws et al. | |
| 7,492,665 B2 | 2/2009 | Robertsson et al. | |
| 7,817,495 B2 | 10/2010 | Ozbek et al. | |
| 8,456,950 B2 | 6/2013 | Hegna | |
| 8,547,786 B2 | 10/2013 | Griffin et al. | |
| 8,712,694 B2 | 4/2014 | Edme et al. | |
| 9,310,502 B2 | 4/2016 | Ozdemir et al. | |
| 9,594,174 B2 | 3/2017 | Goujon et al. | |
| 10,126,452 B2 | 11/2018 | Halliday et al. | |
| 2002/0118602 A1 | 8/2002 | Sen et al. | |
| 2005/0013194 A1 | 1/2005 | Vaage et al. | |
| 2005/0114032 A1 * | 5/2005 | Wang | G01V 1/28 702/14 |
| 2008/0123467 A1 | 5/2008 | Ronnekleiv et al. | |
| 2008/0192571 A1 | 8/2008 | Vaage et al. | |
| 2008/0275649 A1 | 11/2008 | Ozdemir et al. | |
| 2009/0003132 A1 | 1/2009 | Vassallo et al. | |
| 2010/0039892 A1 | 2/2010 | Ray et al. | |
| 2010/0195439 A1 * | 8/2010 | Muyzert | G01V 1/18 367/56 |
| 2010/0211320 A1 | 8/2010 | Vassallo et al. | |
| 2010/0211321 A1 | 8/2010 | Ozdemir et al. | |
| 2010/0211323 A1 | 8/2010 | Ozdemir et al. | |
| 2010/0271904 A1 | 10/2010 | Moore et al. | |
| 2011/0069581 A1 | 3/2011 | Krohn | |
| 2011/0096625 A1 | 4/2011 | Rentsch et al. | |
| 2011/0182140 A1 | 7/2011 | Lambert et al. | |
| 2012/0188845 A1 | 7/2012 | Jeffryes | |
| 2012/0250460 A1 | 10/2012 | Edme et al. | |
| 2012/0316844 A1 | 12/2012 | Shah et al. | |
| 2013/0060544 A1 | 3/2013 | Bakker et al. | |
| 2013/0128696 A1 | 5/2013 | Vassallo et al. | |
| 2013/0135965 A1 | 5/2013 | Ji et al. | |
| 2013/0182533 A1 | 7/2013 | Rentsch-Smith | |
| 2013/0182536 A1 | 7/2013 | Vassallo et al. | |
| 2013/0308426 A1 | 11/2013 | Scarlatti et al. | |
| 2013/0329520 A1 | 12/2013 | van Borselen | |
| 2014/0022860 A1 | 1/2014 | Van Borselen et al. | |
| 2014/0027122 A1 | 1/2014 | Meier et al. | |
| 2014/0029378 A1 | 1/2014 | Van Manen et al. | |
| 2014/0133274 A1 | 5/2014 | Muijzert et al. | |
| 2014/0200812 A1 | 7/2014 | Kitchenside | |
| 2014/0200854 A1 | 7/2014 | Eggenberger et al. | |
| 2014/0211589 A1 | 7/2014 | Maxwell | |
| 2014/0219055 A1 | 8/2014 | Goujon et al. | |
| 2014/0241117 A1 | 8/2014 | Dellinger et al. | |
| 2014/0278116 A1 | 9/2014 | Halliday et al. | |
| 2014/0278119 A1 | 9/2014 | Halliday et al. | |
| 2014/0316709 A1 | 10/2014 | Il et al. | |
| 2014/0334262 A1 | 11/2014 | Brune | |
| 2014/0355379 A1 | 12/2014 | Moldoveanu et al. | |
| 2014/0369161 A1 | 12/2014 | Sallas et al. | |
| 2014/0369163 A1 | 12/2014 | Sallas et al. | |
| 2015/0057938 A1 | 2/2015 | Krohn et al. | |
| 2015/0066374 A1 | 3/2015 | Ji et al. | |
| 2015/0134259 A1 | 5/2015 | Vassallo et al. | |
| 2015/0276955 A1 | 10/2015 | Brune | |
| 2015/0316667 A1 | 11/2015 | Projetti et al. | |
| 2016/0109591 A1 | 4/2016 | Kamil Amin et al. | |
| 2016/0202379 A1 | 7/2016 | Sallas | |
| 2017/0075015 A1 | 3/2017 | Halliday et al. | |
| 2017/0115415 A1 | 4/2017 | Ozbek et al. | |
| 2017/0146673 A1 | 5/2017 | Goujon et al. | |
| 2017/0184746 A1 | 6/2017 | Halliday | |
| 2017/0363756 A1 | 12/2017 | El Allouche et al. | |
| 2017/0363757 A1 | 12/2017 | Halliday et al. | |
| 2018/0143338 A1 | 5/2018 | Halliday | |
| 2018/0164461 A1 | 6/2018 | Halliday et al. | |
| 2019/0079208 A1 | 3/2019 | Halliday et al. | |

FOREIGN PATENT DOCUMENTS

| | | |
|---|---|---|
| CN | 1306621 A | 8/2001 |
| CN | 1664617 A | 9/2005 |
| CN | 101334483 A | 12/2008 |
| CN | 102053272 A | 5/2011 |
| CN | 102269823 A | 12/2011 |
| CN | 102667528 A | 9/2012 |
| CN | 103329009 A | 9/2013 |
| CN | 103582827 A | 2/2014 |
| CN | 104981715 A | 10/2015 |
| EP | 0310253 A2 | 4/1989 |
| EP | 0873528 A1 | 10/1998 |
| RU | 2523734 C2 | 7/2014 |
| RU | 2562932 C2 | 9/2015 |
| WO | 0209014 A1 | 1/2002 |
| WO | 2008152364 A1 | 12/2008 |
| WO | 2010093652 A2 | 8/2010 |
| WO | 2010093739 A2 | 8/2010 |
| WO | 2013105062 A1 | 7/2013 |
| WO | 2013151524 A1 | 10/2013 |
| WO | 2014110330 A1 | 7/2014 |
| WO | 2014130040 A1 | 8/2014 |
| WO | 2014152106 A1 | 9/2014 |
| WO | 2014176116 A1 | 10/2014 |
| WO | 2014177522 A2 | 11/2014 |
| WO | 2014179282 A1 | 11/2014 |
| WO | 2015011160 A1 | 1/2015 |
| WO | 2015109175 A1 | 7/2015 |
| WO | 2015143189 A1 | 9/2015 |
| WO | 2015/168130 A1 | 11/2015 |
| WO | 2016094332 A1 | 6/2016 |
| WO | 2016/168280 A1 | 10/2016 |
| WO | 2016179060 A1 | 11/2016 |
| WO | 2016179206 A1 | 11/2016 |
| WO | 2017096081 A1 | 6/2017 |

OTHER PUBLICATIONS

Supplementary Partial European Search Report issued in related European Patent Application No. 16871528.2 dated Aug. 19, 2019, 7 pages.
Aki, et al., "Quantitative seismology," New York, Freeman and company, 1980.
Lomb, "Least squares frequency analysis of unequally spaced data," Astrophysics and Space Science, 1976, vol. 39, Issue 2, pp. 447-462.
Malischewsky, et al., "Love's formula and H/V-ratio (ellipticity) of Rayleigh waves," Wave motion, 2004, pp. 57-67.
Özbek, et al., 2010, "Crossline wavefield reconstruction from multicomponent streamer data: Part 2—Joint interpolation and 3D

(56) References Cited

OTHER PUBLICATIONS up/down separation by generalized matching pursuit," Geophysics, vol. 75, No. 6, pp. WB69-WB85.
Özdemir, et al., "Interpolation of irregularly sampled data by matching pursuit," Proc. EAGE Conference, paper G025, Rome, Jun. 2008.
Scargle, "Studies in astronomical time series analysis II. statistical aspects of spectral analysis of unevenly sampled data," Astrophysical Journal, vol. 263, pp. 835-853, 1982.
Van Dalen, "Multi-component acoustic characterization of porous media," PhD thesis, Delft University of Technology, 2011.
International Search Report and Written Opinion for the equivalent International patent application PCT/US2016/064481 dated Mar. 17, 2017.
International Preliminary Report on Patentability for the equivalent International patent application PCT/US2016/064481 dated Jun. 14, 2018.
Extended European Search Report and Exam issued in related European Patent Application No. 16871528.2 dated Jan. 8, 2020, 15 pages.
Notice of Allowance issued in U.S. Appl. No. 15/307,742 dated Jun. 14, 2019 (9 pages).
Are Osen, Lasse Amundsen, Arne Reitan; (1999) Removal of water-layer multiples from multicomponent sea-bottom data. Geophysics ; 64 (3) May-Jun. 1999: 838-851.
Abma, R. et al., "Popcorn shooting: Sparse inversion and the distribution of airgun array energy over time", 83rd Annual International Meeting, SEG, Expanded Abstracts, 201, pp. 31-35.
Amundsen, L. et al., "Multicomponent ocean bottom and vertical cable seismic acquisition for wavefield reconstruction", Geophysics, 2010, 75(6), pp. WB87-WB94.
Hampson, G. et al., "Effects of Source and Receiver Motion on Seismic Data", 1990, SEG Technical Program Abstracts, pp. 859-862.
Hopperstad, J. et al., "Fundamental Principles of Isotropic Marine Source Design", B025, 70th EAGE Conference & Exhibition held in Rome, Italy 2008, 5 pages.
Hopperstad, J-F., et al., "Where is the center of a multi-depth marine source array?", 78th SEG 2008 Annual Meeting, Las Vegas, Nevada, USA, pp. 40-44.
Kristiansen, P. et al., "Deepwater OBN—Exploiting data-processing possibilities", SEG Technical Program Abstracts, 2014, pp. 4258-4262.
Linden, D. A., "A Discussion of Sampling Theorems," Proceedings of the IRE, 1959, 47(7), pp. 1219-1226.
Mallat, S. et al, "Matching Pursuits with Time-Frequency Dictionaries", IEEE Transactions on Signal Processing, 1993, 41(12), pp. 3397-3415.
Moore, et al., "Simultaneous Source Separation Using Dithered Sources", SEG Las Vegas 2008 Annual Meeting, pp. 2806-2810.
Paffenholz, J. et al., "Shear Wave Noise on OBS VZ Data—Part II Elastic Modeling of Scatters in the Seabed", Proceedings of the 75th EAGE Conference & Exhibition, 2006, 5 pages.
Papoulis, A., "Generalized Sampling Expansion", IEEE Transactions on Circuits and Systems, 1977, 24(11), pp. 652-654.
Schalkwijk, K. M. et al., "Adaptive decomposition of multicomponent ocean-bottom seismic data into downgoing and upgoing P- and S-waves", Geophysics, 2003, 68(3), pp. 1091-1102.
Vassallo, M. et al., "Crossline wavefield reconstruction from multicomponent streamer data: Part 1—Multichannel Interpolation by matching pursuit (MIMAP) using pressure and its corssline gradient", Geophysics, 2010, 75(6), pp. WB53-WB67.
Search Report and Written Opinion of International Patent Application No. PCT/US2017/037587, dated Sep. 8, 2017, 17 pages.
International Preliminary Report on Patentability of International Patent Application No. PCT/US2017/037587, dated Dec. 27, 2018, 13 pages.
Office Action received in U.S. Appl. No. 15/624,403 dated Mar. 13, 2019, 11 pages.
International Preliminary Report on Patentability of International Patent Application No. PCT/US2017/037586, dated Dec. 27, 2018, 11 pages.
Office Action Issue in U.S. Appl. No. 15/624,669, dated Aug. 31, 2018, 7 pages.
Search Report and Written Opinion of International Patent Application No. PCT/US2017/037586, dated Sep. 8, 2017, 14 pages.
Search Report and Written Opinion of International Patent Application No. PCT/US2016/030344, dated Sep. 21, 2016, 13 pages.
International Preliminary Report on Patentability for the equivalent International Patent Application PCT/US2016/030344, dated Nov. 16, 2017, 12 pages.
Search Report and Written Opinion of International Patent Application No. PCT/US2016/030636, dated Aug. 12, 2016, 15 pages.
International Preliminary Report on Patentability of International Patent Application No. PCT/US2016/030636, dated Nov. 16, 2017, 12 pages.
Search Report in related European Patent Application No. 16789960.8 dated Nov. 19, 2018, 3 pages.
Search Report and Written Opinion of related International Patent Application No. PCT/US2015/028002, dated Jul. 24, 2015, 9 pages.
International Preliminary Report on Patentability of International Patent Application No. PCT/US2015/028002, dated Nov. 10, 2016, 7 pages.
Supplementary Search Report of European Patent Application No. 15785227.8, dated Nov. 10, 2017, 3 pages.
Office Action in European Patent Application No. 15785227.8, dated Mar. 12, 2018, 7 pages.
First Office Action and Search Report issued in Chineese Patent Application No. 201580025632.6, dated Mar. 23, 2018, 21 pages with English Translation.
Second Office Action issued in Chineese Patent Application No. 201580025632.6, dated Feb. 21, 2019, 18 pages with English Translation.
Search Report in European Patent Application No. 16789874.1 dated Apr. 30, 2019, 4 pages.
Halliday, D. et al., "Full-wavefield, towed-marie seismic acquisition and applications", SEG Technical Program Expanded Abstracts, 2012, pp. 1-5.
Russian Search Report; RU Application No. 2018123176/28(036717); dated Mar. 12, 2020.
Office Action issued in U.S. Appl. No. 15/571,029 dated Feb. 14, 2020, 46 pages.
Final Rejection issued in U.S. Appl. No. 15/624,403 dated Oct. 31, 2019, 11 pages.
GC Examination Report for Application No. GC 2016-32488 dated Dec. 18, 2019, 6 pgs.
Office Action issued in U.S. Appl. No. 15/572,016 dated Jun. 26, 2020, 13 pages.
Chinese Notification of Allowance; CN Application No. 2016800754152; dated Nov. 30, 2020.

\* cited by examiner

LAND SEISMIC SENSOR SPREAD WITH ADJACENT MULTICOMPONENT SEISMIC SENSOR PAIRS ON AVERAGE AT LEAST TWENTY METERS APART

CROSS REFERENCE TO RELATED APPLICATIONS

The present application claims priority to U.S. Patent Application No. 62/261,934 that was filed on Dec. 2, 2015, entitled "Multicomponent Noise Attenuation by Matching Pursuit" which is hereby incorporated by reference in its entirety.

TECHNICAL FIELD

The present application relates to seismic surveys and multicomponent sensor arrays.

BACKGROUND

Hydrocarbons and other mineral deposits may be located in an earth formation far below the surface of the earth. These deposits can be accessed by drilling and/or mining, which involves digging into the earth in various ways to reach the mineral deposits. In the case of hydrocarbon retrieval, the digging of an oil well can be very expensive, and further, due to permitting and other legalities, can be time consuming and burdensome to even obtain the right to do so.

One way to determine the presence of mineral deposits in the subsurface before exploration is with seismic surveys. In a seismic survey, a source signal may be generated and sent into the earth formation, where the signal encounters and reflects/reverberates depending on aspects of the formation. Components of that signal may return to the surface and can be detected and recorded by seismic sensors to produce seismic data that, when analyzed and/or processed, can provide information about the subsurface formation including mineral deposits. The reflected signal that may return to the surface may be referred to as a seismic wavefield.

In seismic surveys, complications may arise from surface and interface waves (e.g., ground roll and guided waves). By creating a source signal that travels in a generally downward direction into a formation, a surface and/or interface wave may be created. The surface wave may travel along the surface of the ground or along an interface. When the seismic sensors encounter the surface or interface wave, it can interfere with proper detection of the seismic signal. It can be difficult to differentiate the contribution of a seismic signal and the contribution of surface and/or interface wave noise.

Thus, it may be of interest to identify and remove or attenuate the surface and/or interface wave noise component from any seismic signal component.

SUMMARY OF DISCLOSURE

In one implementation, a method for performing a seismic survey is provided. The method may include deploying a plurality of multicomponent seismic sensors proximate to earth surface, each of the multicomponent seismic sensors being capable of measuring rotation, wherein the average spacing between each adjacent seismic multicomponent sensor pair is at least twenty meters, inputting a seismic signal into the earth surface so that the plurality of multicomponent seismic sensors detect multiple components of the seismic signal including vertical, horizontal and rotational components.

In some implementations, the multicomponent seismic sensors may comprise two linear sensors that are spaced apart from one another in a direction that is substantially perpendicular to the earth surface, so that ground roll is evidenced by differencing linear signals detected at the two linear sensors. In some embodiments, the multicomponent seismic sensors may comprise at least two rotation sensors that are configured substantially orthogonal to one another.

In another implementation, a seismic survey spread may include a plurality of multicomponent seismic sensors proximate to earth surface, each of the multicomponent seismic sensors being capable of measuring rotation, wherein the average spacing between each adjacent multicomponent seismic sensor pair is at least twenty meters.

In some implementations, the multicomponent seismic sensors may comprise two linear sensors that are spaced apart from one another in a direction that is substantially perpendicular to the earth surface, so that ground roll is evidenced by differencing linear signals detected at the two linear sensors. In some embodiments, the multicomponent seismic sensors may comprise at least two rotation sensors that are configured substantially orthogonal to one another.

In another implementation, a system for multicomponent noise attenuation of a seismic wavefield is provided. The system may include a computing device having at least one processor configured to receive seismic data associated with a seismic wavefield over at least one channel of a plurality of channels from one or more seismic sensor stations. In some embodiments, the one or more seismic sensor stations are disposed relative to a surface with an average distance of at least twenty meters between each of the one or more adjacent seismic sensor stations. The at least one processor may be further configured to identify a noise component on the at least one channel of the plurality of channels. The at least one processor may also be configured to attenuate the noise component on the at least one channel of the plurality of channels based upon, at least in part, the seismic data received from the one or more seismic sensor stations.

In some implementations, the at least one processor may be further configured to model the seismic wavefield as a sum of one or more basis functions. The at least one processor may be further configured to determine an optimum wavenumber and an amplitude from one or more of a multichannel cost function and a single channel cost function. The at least one processor may be further configured to derive a first channel of the plurality of channels from a vertical translational component of the seismic wavefield and a second channel of the plurality of channels from a horizontal translational component of the seismic wavefield. In some embodiments, a relationship between the first and second channel may be described by a physical model of the noise component based upon, at least in part, the ellipticity of the noise component. The at least one processor may be further configured to apply one or more of the physical model of the noise component and one or more spatial gradients to the one or more basis functions. The at least one processor may be further configured to determine a phase shift between the first and second channel. The at least one processor may be further configured to derive a third channel of the plurality of channels, from a horizontal translational component of the seismic wavefield at a depth, relative to the surface, greater than the second channel, and an exponential amplitude decay between the second and third channel. In some embodiments, the at least one processor may be further configured to estimate a spatial gradient of the seismic wavefield based upon, at least in part, the amplitude decay. The at least one processor may be further configured to derive a first channel of the plurality of channels from the vertical translational component of the seismic wavefield and a second channel of the plurality of channels from a rotational component of the seismic wavefield.

In another implementation, a method for multicomponent noise attenuation of a seismic wavefield is provided. The method may include receiving, at one or more processors, seismic data associated with a seismic wavefield over at least one channel of a plurality of channels from one or more seismic sensor stations. In some embodiments, the one or more seismic sensor stations are disposed relative to a surface with an average distance of at least twenty meters between each of the adjacent one or more seismic sensor stations. The method may also include identifying, using the one or more processors, a noise component on the at least one channel of the plurality of channels. The method may further include attenuating, using the one or more processors, the noise component on the at least one channel of the plurality of channels based upon, at least in part, the seismic data received from the one or more seismic sensor stations.

In some implementations, identifying the noise component on the at least one channel of the plurality of channels may include modeling the seismic wavefield as a sum of one or more basis functions. In some embodiments, identifying the noise component on the at least one channel may also include determining an optimum wavenumber and an amplitude from one or more of a multichannel cost function and a single channel cost function. Identifying the noise component on the at least one channel may further include deriving a first channel of the plurality of channels from a vertical translational component of the seismic wavefield and a second channel of the plurality of channels from a horizontal translational component of the seismic wavefield. In some embodiments, a relationship between the first and second channel may be described by a physical model of the noise component based upon, at least in part, the ellipticity of the noise component. In some embodiments, identifying the noise component on the at least one channel may also include applying one or more of the physical model of the noise component and one or more spatial gradients to the one or more basis functions. Identifying the noise component on the at least one channel may further include deriving a third channel of the plurality of channels, from a horizontal translational component of the seismic wavefield at a depth, relative to the surface, greater than the second channel, and an exponential amplitude decay between the second and third channel. In some embodiments, the method may also include estimating a spatial gradient of the seismic wavefield based upon, at least in part, the amplitude decay. In some embodiments, identifying the noise component on the at least one channel may also include deriving a first channel of the plurality of channels from the vertical translational component of the seismic wavefield and a second channel of the plurality of channels from a rotational component of the seismic wavefield.

In yet another implementation, a system for multicomponent noise attenuation of a seismic wavefield is provided. The system may include a computing device having at least one processor configured to receive seismic data associated with a seismic wavefield over at least one channel of a plurality of channels from one or more seismic sensor stations. In some embodiments, the one or more seismic sensor stations are disposed relative to a surface with an average distance of at least twenty meters between each of the one or more adjacent seismic sensor stations. The at least one processor may be further configured to identify a noise component on the at least one channel of the plurality of channels. The at least one processor may also be configured to model the seismic wavefield as a sum of one or more basis functions. The at least one processor may be further configured to derive a first channel of the plurality of channels from the vertical translational component of the seismic wavefield and a second channel of the plurality of channels from a rotational component of the seismic wavefield. The at least one processor may also be configured to attenuate the noise component on the at least one channel of the plurality of channels based upon, at least in part, the seismic data received from the one or more seismic sensor stations.

This summary is provided to introduce a selection of concepts that are further described below in the detailed description. This summary is not intended to identify essential features of the claimed subject matter, nor is it intended to be used as an aid in limiting the scope of the claimed subject matter.

BRIEF DESCRIPTION OF THE DRAWINGS

Embodiments of the present disclosure are described with reference to the following figures.

Like reference symbols in the various drawings may indicate like elements.

DETAILED DESCRIPTION

Figure 1:
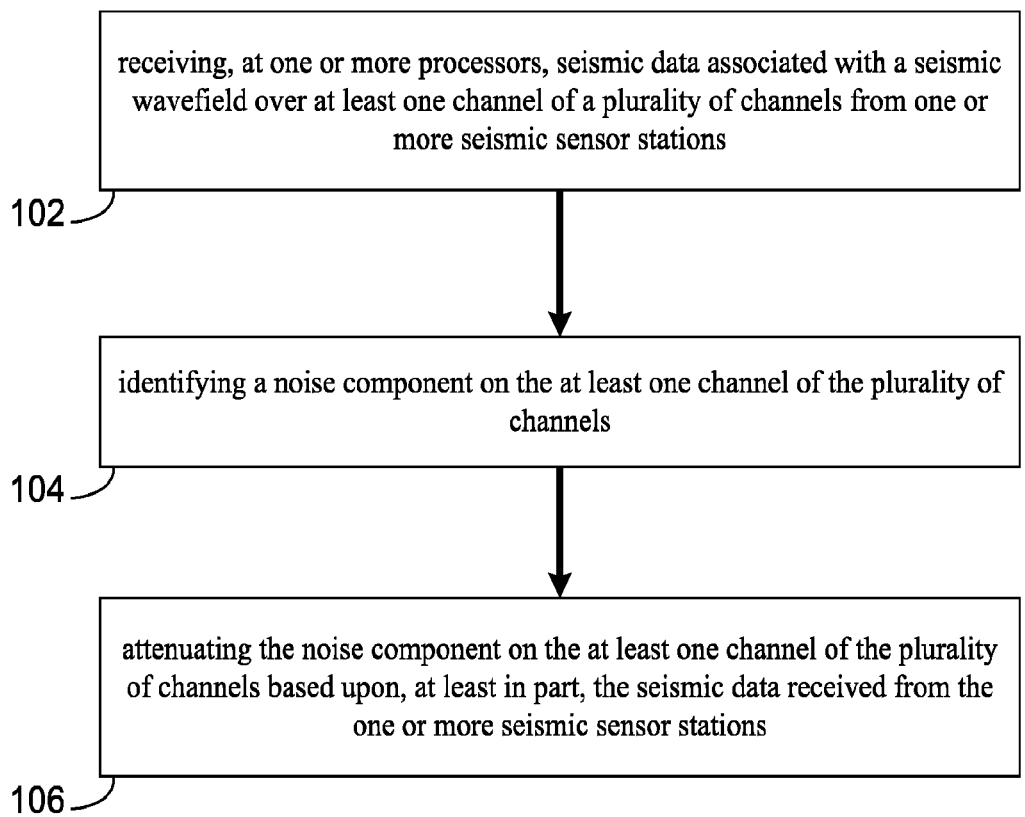
FIG. 1 is a flow diagram of a process in accordance with implementations of various techniques described herein.

The discussion below is directed to certain implementations. It is to be understood that the discussion below is only for the purpose of enabling a person with ordinary skill in the art to make and use any subject matter defined now or later by the patent "claims" found in any issued patent herein.

It is specifically intended that the claimed combinations of features not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business related which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered a same object or step.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Embodiments of multicomponent noise attenuation process 100 shown in FIGS. 1-10 may identify and attenuate noise components on the seismic wavefield during reconstruction of the seismic wavefield from multiple measurements made at discrete locations. As such, multicomponent noise attenuation process 100 may be used to reconstruct seismic wavefields without noise components. As shown in FIG. 1, embodiments of multicomponent noise attenuation process 100 may be configured to attenuate noise components on a seismic wavefield. Embodiments of multicomponent noise attenuation process 100 may include receiving (102), at one or more computing devices, seismic data associated with a seismic wavefield over at least one channel of a plurality of channels from one or more seismic sensor stations. In some embodiments and as discussed above, the one or more seismic sensor stations are disposed relative to a surface with an average distance of at least twenty meters between each of the one or more adjacent seismic sensor stations. Multicomponent noise attenuation process may also include identifying (104), at the one or more processors, a noise component on the at least one channel of the plurality of channels and attenuating (106), at the one or more processors, the noise component on the at least one channel of the plurality of channels based upon, at least in part, the seismic data received from the one or more seismic sensor stations. These operations, and others, are discussed in further detail below. Additionally, multicomponent noise attenuation process 100 may be used in situations with multidimensional geometries (e.g., no limit on dimensions), an arbitrary number of channels per station, channel transfer functions that can change from point to point and/or the like.

Figure 2:
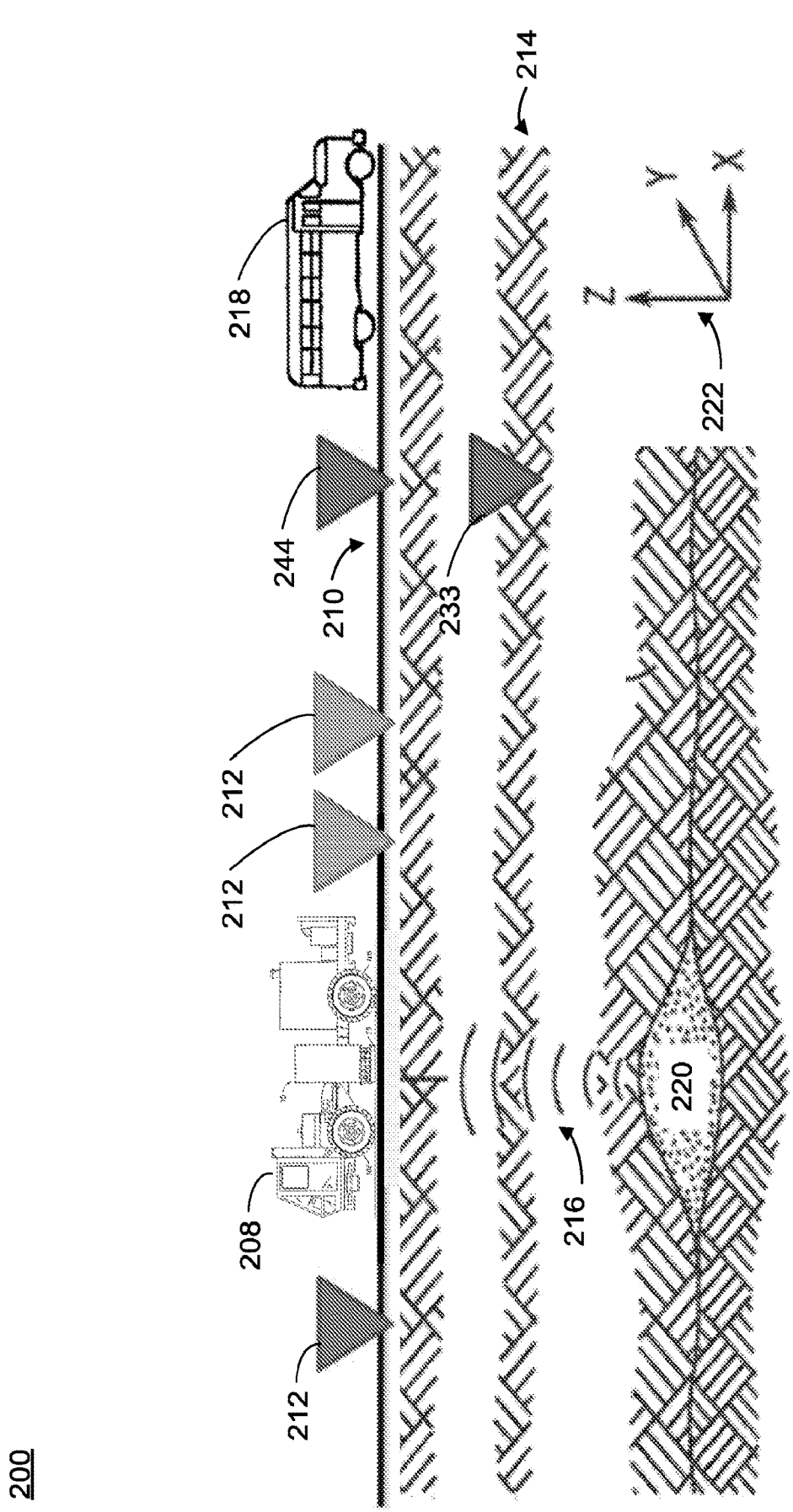
FIG. 2 illustrates a diagram of a land seismic survey system in accordance with implementations of various techniques described herein.

FIG. 2 illustrates a data acquisition system for a land seismic survey system 200. Land seismic survey system 200 may include one or more seismic vibrators 208 (e.g., truck-mounted device) that may be disposed relative to a surface 210 (e.g., on, above, or below a surface) and one or more seismic sensor stations 212 that may contain one or more seismic receivers to sense seismic energy that is produced by the vibrator(s) 208. In some embodiments, the one or more seismic sensor stations 212 may define an array of seismic sensor stations and/or seismic receivers. A seismic sensor station 212 may define a region in space that includes one or more seismic receivers. In some embodiments, a seismic sensor station 212 may be associated with a one-dimensional (1-D), two-dimensional (2-D) or three-dimensional (3-D) space. The seismic sensor stations 212 may also be disposed relative to the surface 210. As part of operations associated with a vibroseis survey, the seismic vibrator(s) 208 may generate vibroseis seismic sweeps. The sweeps, in turn, may inject corresponding vibroseis sweep signals into the Earth 214 (e.g., into the land) and these signals may be reflected by the surveyed subsurface geologic structure 214 to produce corresponding reflected signals 216 that may be detected by the seismic sensor stations 212. In some embodiments involving land seismic survey system 200, the signal can be created with a land vibrator 208 that impacts the ground or with explosives. A data acquisition system 218 (e.g., within a seismic data recording vehicle, for example) of the land seismic survey system 200 may receive the raw seismic data acquired by the seismic receivers and the raw seismic data (e.g., seismic data associated with a seismic wavefield) may then be processed to yield information about subsurface reflectors and the physical properties of the surveyed geologic structure 214.

In some embodiments, multicomponent noise attenuation process 100 may include building up/reconstructing an image of a survey area for purposes of identifying subterranean geological formations or targets, such as the geological formation 220 based upon the seismic data received from the seismic receivers. Subsequent analysis of the seismic data may reveal probable locations of hydrocarbon deposits in subterranean geological formations. Depending on the particular survey design, portions of the analysis of the seismic data may be performed by a data acquisition system 218 on a seismic data recording vehicle.

For simplicity, the above examples may be related to seismic imaging in seismic exploration, in which the waves emitted by sources are reflected by the target and received by seismic receivers. The subsurface media 214 may contain different layers and interfaces between the layers. The different layers may cause undesirable internal reverberations that need to be dealt with or avoided. However, multicomponent noise attenuation process 100 may be equally applicable to propagating wave systems that have interfaces in the wave traveling path in any arrangement, as long as the waves emitted by the sources are disturbed in some way by the target or interfaces and the disturbed waves are received by receivers. In some embodiments, the receivers may be on both sides.

The different waves (propagative and/or dissipative), sources, or receivers in different industries do not affect the wave propagation properties and the imaging processes. In seismic imaging, the wavefield may be an elastic wave or an acoustic wave. The target may be a subsurface geological structure. The sources may be elastic or acoustic wave generators (e.g., airguns, vibrators, etc.) and the receivers may be pressure or particle motion receivers (e.g., geophones, hydrophones, accelerometers or similar).

As discussed above, complications may arise in seismic surveys from ground roll noise. Ground roll, as used herein, may be a type of coherent noise generated by a surface wave, a low-velocity, low-frequency, high-amplitude Rayleigh wave. Ground roll can obscure signal and degrade overall data quality during seismic acquisition. Ground roll may be created when a source signal travels in a generally downward direction into a formation. The ground roll may travel along the surface of the ground and when the seismic sensors encounter the ground roll, it can interfere with proper detection of the seismic signal.

In some embodiments of multicomponent noise-attenuation process 100, the one or more seismic sensor stations are disposed relative to a surface with an average distance of at least twenty meters between each of the one or more adjacent seismic sensor stations. In one example, each of the one or more seismic sensor stations may be disposed relative to a surface with a distance of at least twenty-five meters between each of the one or more adjacent seismic sensor stations. Referring again to FIG. 2, in land seismic survey systems, survey spreads using single component sensor stations (also referred herein to as sensors) have been constrained by way of sensor spacing in order to attenuate ground roll noise. One instance of this may be seen from WesternGeco's commercially available UniQ land seismic acquisition platform. In configurations that have been deemed commercially and technically viable on land, the sensor spacing is below 25 (twenty-five) meters in order to provide proper ground roll attenuation. In fact, the commercial applications of the UniQ platform may be formatted so that the sensors are spaced approximately 12.5 meters from one another in order to provide adequate seismic signal sensing and ground roll attenuation by way of modeling of the ground roll and subsequent removal/attenuation, as will be discussed below in greater detail.

The commercial dynamics are also constrained by this sensor spacing requirement since a large component of the capital cost of a land seismic system may be tied to the cost of the sensors, which may be directly related to the number of sensors that are required. Therefore, if fewer sensors are needed, the overall cost of the sensors may be reduced in a related manner.

As discussed above, it may be of interest to attenuate ground roll noise components during seismic surveys. One way this issue may be addressed is by modeling the ground roll. This can be done with various methods based on sensing single component signals at sensors that are spaced at a defined distance from one another in a seismic spread. Because of constraints that will be discussed in more detail herein, in order to adequately model and attenuate ground roll noise with single component sensors, land seismic sensors may be limited functionally to being at most 25 meters apart from one another in practice on land.

In one example, a ground roll may be created in response to a seismic survey. The velocity of the ground roll may range from 300-1000 meters per second (m/s), other ranges may be between 500-900 m/s. Frequencies of the ground roll may range from 10-40 Hz. with most between 20-30 Hz. The main modes of the ground roll may have a velocity of 600-900 m/s with a frequency of 25-30 Hz. There may be a second mode with a velocity of 900-1400 m/s with a frequency of 35-40 Hz. The wavelength of the ground roll may be anywhere from approximately 10-150 meters, and may be around 25-35 meters. Because of these ground roll characteristics, the UniQ land system, and other current systems, may limit sensor spacing to 12.5 meters. At this spacing, the UniQ land system may handle ground roll wavelengths down to 25 meters (e.g., 2× sensor spacing) without the seismic data being spatially aliased.

Additionally, the coherent noise, caused by surface and interface waves (i.e., ground roll), may propagate slowly compared to reflections (e.g., acoustic signal 216) from a deeper part of the subsurface 214. The low propagation velocity of these types of waves may put a constraint on the spatial sampling of the seismic data in the field and hence may reduce the efficiency and quality of seismic surveys.

According to embodiments of the present disclosure, using multicomponent seismic sensor stations with multicomponent noise attenuation process 100 as described herein, may enable a sensor spread configuration where the sensors are spaced apart from one another at an average distance of at least 20 meters. In some embodiments, the sensors may be spaced 25 meters apart from one another, and often times at a distance greater than 50 meters.

Referring to FIGS. 1-10, various embodiments consistent with multicomponent noise attenuation process are provided. As shown in FIG. 1, embodiments of multicomponent noise attenuation process may attenuate noise components on a seismic wavefield. Embodiments of multicomponent noise attenuation process may include receiving (102), at one or more processors, seismic data associated with a seismic wavefield over at least one channel of a plurality of channels from one or more seismic sensor stations. In some embodiments and as discussed above, each of the one or more seismic sensor stations may be disposed relative to a surface with an average distance of at least twenty meters between each of the one or more adjacent seismic sensor stations. Multicomponent noise attenuation process may also include identifying (104), using the one or more processors, a noise component on the at least one channel of the plurality of channels and attenuating (106), using the one or more processors, the noise component on the at least one channel of the plurality of channels based upon, at least in part, the seismic data received from the one or more seismic sensor stations. These operations, and others, are discussed in further detail below.

In some embodiments, multicomponent noise attenuation process 100 may include receiving (102), at one or more processors, seismic data associated with a seismic wavefield over at least one channel of a plurality of channels from one or more seismic sensor stations. The seismic data may be acquired from a land seismic survey system 200 (a borehole survey, a vibroseis survey, and so forth). The survey may comprise seismic monitoring of hydrocarbon production from a subterranean reservoir. Referring again to FIG. 2, the seismic data may be acquired by a plurality of multichannel sensors (e.g., sensors/receivers within seismic sensor stations 212), such as hydrophones, inline (e.g., horizontal along x-axis of axes 222) particle motion receivers, vertical particle motion receivers, gradient receivers, and so forth. Each seismic sensor station 212, through one or more component sensors/receivers, may measure displacement, velocity, acceleration, and/or rotation associated with components of a seismic wavefield. The one or more component sensors may also measure displacement, velocity, acceleration, and/or rotation in, for example, three orthogonal directions. In one example, a seismic sensor station 212 may include three component sensors (e.g., a 3C multicomponent sensor) configured to measure displacement, velocity, acceleration, rotation, etc. with each sensor oriented in one of three orthogonal directions. It should be appreciated that as used herein, adjacent sensor stations mean the nearest two sensor stations along a straight line between that respective pair. As shown in FIG. 2, the two sensor stations 212 to the right of the vibrator 208 are adjacent to one another, while the sensor station 212 farthest to the right is not adjacent to the sensor station 212 farthest to the left of the vibrator 208, because there is an interceding sensor station 212 there between along the straight line between the pair.

According to some embodiments, multicomponent sensors can measure rotation and also measure linear seismic signals. According to some embodiments, this can be done by combining multiple linear sensors in a single sensor unit so that linear sensors detect vertical seismic signals, and horizontal signals, and by way of two linear sensors that are spaced apart from one another can thereby calculate the ground roll effect by differencing linear signals. United States Patent Application Publication No. US2014/0219055 is entitled "Computing rotation data using a gradient of translational data" and is incorporated by reference in its entirety herein, and discloses some of such designs. A style of multicomponent sensor uses linear sensors and rotation sensors with rotating members that rotate about an anchor, combined into a single sensor unit, so that the sensor unit can measure linear seismic signals with linear sensors, and measure angular (rotation) movement and effects directly with the rotating member. The rotation sensors can use MEMS sensors. United States Patent Application Publication No. US2015/0316667 entitled "Mems-based rotation sensor for seismic applications and sensor units having same" and is incorporated by reference in its entirely herein, discloses some of such designs.

Figure 3:
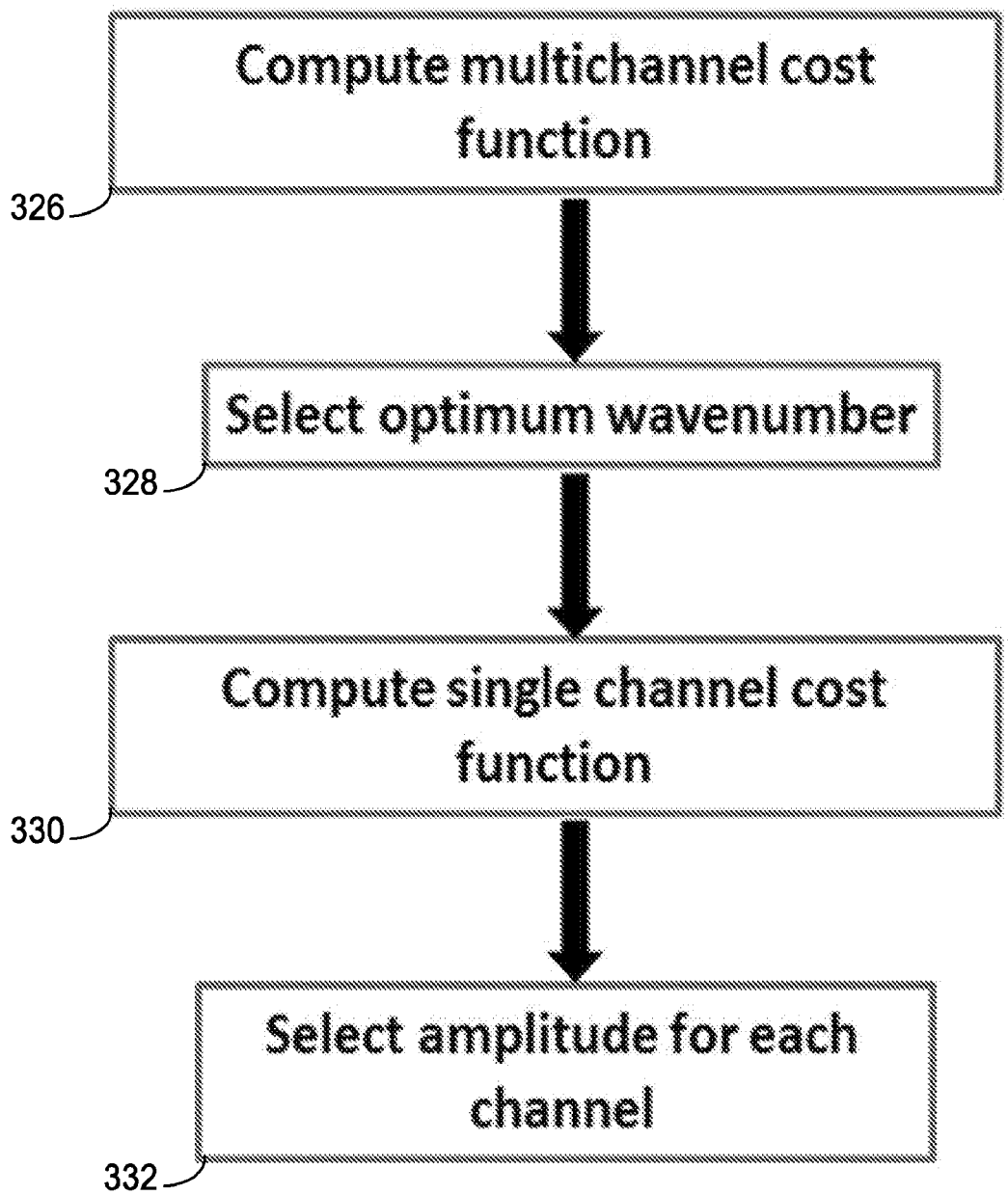
FIGS. 3-8 illustrate various flow diagrams of processes and workflows in accordance with implementations of various techniques described herein.

Multicomponent data (e.g., seismic data) may be measured directly with three component sensors (measuring displacement, velocity, acceleration, rotation or any combination of these) and/or estimated from two or more three component sensors (e.g., three component sensors in two or more separate seismic sensor stations 212) separated laterally or vertically as shown in FIGS. 2-3. Multicomponent data, as used herein, may include but is not limited to the combination of data from the components of a seismic wavefield and/or gradients of the seismic wavefield. In some embodiments, a particular type of measurement from the one or more seismic sensor stations 212 may be associated with a channel. As such, a particular channel may measure a property, such as pressure, of the seismic wavefield and another channel may measure another property of the seismic wavefield, such as vertical particle motion (e.g., a vertical component) of the seismic wavefield, and so forth. In combination with one or more component sensors/receivers from one or more seismic sensor stations, seismic data associated with a seismic wavefield may be received over at least one channel of a plurality of channels from one or more seismic sensor stations 212.

In some embodiments, single component sensors may be used with multicomponent noise attenuation process 100. However, single component sensors may be unable to model and/or attenuate noise when the ground roll/surface waves are not adequately sampled in a spatial dimension (e.g., when adjacent single component sensors are separated by a greater distance). In other embodiments, multicomponent sensors (e.g., seismic sensor stations with more than one seismic sensor/receiver) may be used to model and attenuate noise with multicomponent noise attenuation process 100. In such embodiments and as will be discussed in greater detail below, a multicomponent sensor may be able to more effectively model and attenuate the ground roll in a spatial dimension and the distance between multicomponent sensors and/or seismic sensor stations 212 may be increased.

In some embodiments, multicomponent noise attenuation process 100 may also include identifying (104), at the one or more processors, a noise component on the at least one channel of the plurality of channels. As discussed above, noise may be introduced into seismic data and/or on at least one channel from ground roll in land. In some embodiments, and as will be discussed in greater detail below, noise and signal components of a seismic wavefield may be identified and separated using model-based constraints and a matching pursuit approach. The model-based constraints may fit the noise component(s) in the seismic data (e.g., measurements over the at least one channel) which, in some embodiments, may be assumed to be spatially aliased. The noise component may be reconstructed by a matching pursuit approach and subtracted from the input measurements. The signal components may be left as much as possible in the residual. Depending on the available knowledge of the shallow subsurface, physical models of the noise component may be either formulated in a cost function used in the matching pursuit approach and/or used as an additional noise/signal identification activity.

In some embodiments, identifying the noise component on the at least one channel of the plurality of channels may include modeling the seismic wavefield as a sum of one or more basis functions. In some embodiments, data representative of measurements of a signal may be used to reconstruct the signal. In one example, the signal may be a seismic wavefield (a pressure wavefield or particle motion wavefield, as examples), and seismic data (acquired by seismic receivers), which may represent one or more properties of the seismic wavefield are processed for purposes of reconstructing the seismic wavefield. More specifically, a parametric matching pursuit-based technique or approach, called an "Extended Generalized Matching Pursuit-based technique," or "EGMP-based technique," herein, may be for signal reconstruction. The EGMP-based technique, as applied to the reconstruction of seismic wavefields, is described in commonly assigned co-pending United States Patent Application No. PCT/US2015/028002, entitled, "Wavefield Reconstruction" which is incorporated herein by reference. The EGMP-based technique may be used to reconstruct a seismic wavefield or, in general, reconstruct any signal of which no direct samples of the signal may be available.

In some embodiments, processing of the seismic data to reconstruct the seismic wavefield may take into account one or more actual measurement channels (pressure and particle motion channels, for example) that may directly measure properties of the seismic wavefield, and/or at least one constructed measurement channel that measures a property of the seismic wavefield after the seismic wavefield has undergone a known forward transformation. Moreover, a given forward transformation may be used to derive a given constructed measurement channel from one or more of the actual measurement channels.

In some embodiments, the seismic wavefield, may be considered to be an unknown signal called "s(x)," and the seismic wavefield may be modeled as a sum of parametric basis functions $\beta(x; \theta_p)$ with parameter set $\theta_p$, as described below:

$$s(x) = \Sigma_p \beta(x; \theta_p) \qquad \text{Eq. 1}$$

In Eq. 1, "x" may denote a point in multi-dimensional coordinates. There are various basis functions that may be used. As an example, for seismic applications, the following exponential basis function may be used:

$$\beta(x; \theta_p) = c_p \exp(jk_p \cdot x) \qquad \text{Eq. 2}$$

where the parameter set "$\theta_p$" includes a complex amplitude "$c_p$" and wavenumber vector "$k_p$." With this choice, the basis functions may correspond to local plane waves. It is assumed that an additional dimension may be present (such as time or temporal frequency), but this dependence is suppressed in the following discussion for the sake of simplicity, without loss of generality. It is assumed, therefore, in the following equations, for purposes of clarity and simplicity that the temporal frequency is fixed.

From a seismic survey or the like, measurements of the unknown signal s(x) may be available at discrete positions in space. In the following discussion, the discrete positions are the positions of the seismic sensor stations 212. At each seismic sensor station, one or more seismic receivers may record multichannel measurements of the unknown signal s(x). The number of channels per seismic sensor station 212 may be one or more.

With multichannel sampling (sometimes called "generalized sampling") each channel may not sense the signal itself, but a version of the signal after it has undergone a known transformation (a filter, for example). Thus, as noted above, the channels may include actual measurement channels and/or constructed measurement channels. By way of example, a gradient of the unknown signal s(x) may be sensed at a seismic sensor station 212.

If there are M types of channels in a multichannel sampling scenario, the set of seismic sensor stations 212 as may be denoted as follows:

$$x_S = \{x_1, x_2, \ldots x_M\} \qquad \text{Eq. 3}$$

where a given station vector, $x_m$, may be represented as $x_m = \{x_{m1}, x_{m2}, \ldots x_{mN_m}\}$. In this notation, "m"=1, 2, ... M and represents the set of $N_m$ positions that correspond to channel m. A measurement vector $m(x_S)$ may be described as follows:

$$m(x_s) = \begin{bmatrix} m_1(x_1) \\ m_2(x_2) \\ \vdots \\ m_M(x_M) \end{bmatrix} \qquad \text{Eq. 4}$$

where each measurement vector $m_m(x_m)$ contains all the measurements of channel type m, as described below:

$$m_m(x_m) = \begin{bmatrix} m_m(x_{m1}) \\ m_m(x_{m2}) \\ \vdots \\ m_m(x_{mN_m}) \end{bmatrix} \qquad \text{Eq. 5}$$

Each entry $m_m(x_{mn})$ may be described as follows:

$$m_m(x_{mn}) = \Sigma_p \eta_m(k_p, x_{mn}) c_p \exp(jk_p \cdot x_{mn}) \qquad \text{Eq. 6}$$

where "$\eta_m(k_p, x_{mn})$" is a function that describes a forward transformation from the unknown signal s(x) to the measurement channel at spatial positions $x_{mn}$. This formulation is quite general and in some cases the forward transformation may be independent of spatial coordinates, i.e., could be described by the following function:

$$\eta_m(k_p, x_{mn}) = \eta(k_p) \qquad \text{Eq. 7}$$

In some embodiments and referring also to FIG. 3, identifying the noise component on the at least one channel may include determining an optimum wavenumber and an amplitude from one or more of a multichannel cost function and a single channel cost function. In accordance with the EGMP-based technique, forward transformations that describe the actual and constructed measurement channels may be applied to candidate basis functions. The candidate basis functions may be optimized by iteratively matching the basis functions to one or more multichannel measurements (e.g., from seismic data). In some embodiments, parameters of parameter set "$\theta_p$" for one or more basis functions may be determined in an iterative fashion. At one or more iterations, the candidate basis functions may be matched to the measurements that are associated with each channel. In some embodiments, the candidate basis function may not be matched to the measurement directly, but after it undergoes the transformation that describes the channel.

As will be discussed in greater detail below, at every iteration, a least-squares optimization problem may be solved to determine the optimal parameters of the candidate basis function. A condition of optimality may be derived, which may relate the optimal values of the complex amplitude and the wavenumber. Using this relationship, the optimization problem may be reduced to finding an optimal wavenumber. This may include finding the maximum of the generalized Lomb spectrum, as shown in Eq. 20 below. In the special case of a single channel being present, this may reduce to the ordinary Lomb spectrum. As used herein, the generalized Lomb spectrum and the ordinary Lomb spectrum may refer to the multichannel cost function and the single channel cost function, respectively. The multichannel cost function may be used to constrain the selection of the optimum wavenumber in the case of spatial aliasing, as it may help distinguish between the true optimum wavenumber and any replicas.

At the p-th iteration, i.e., after P−1 basis functions have been determined previously, the residual in the measurements may be represented as follows:

$$r^{P-1}(x_s) = m(x_S) - \sum_{p=1}^{P-1} c_p h(k_p, x_S) \qquad \text{Eq. 8}$$

where $$r^P(x_S) = \begin{bmatrix} r_1^p(x_1) \\ r_2^p(x_2) \\ \vdots \\ r_M^p(x_M) \end{bmatrix} \qquad \text{Eq. 9}$$

is the vector of residuals after iteration p. Here, $$r_m^P(x_m) = \begin{bmatrix} r_m^p(x_{m1}) \\ r_m^p(x_{m2}) \\ \vdots \\ r_m^p(x_{mN_m}) \end{bmatrix} \qquad \text{Eq. 10}$$

denotes the vector of residuals for channel m. Vector $h(k_p, x_S)$ of Eq. 8 may be defined as follows:

$$h(k_P, x_S) = \eta(k_P, x_S) \otimes d(k_P, x_S) \qquad \text{Eq. 11}$$

where $\otimes$ denotes the Kronecker product, and $$\eta(k, x_S) = \begin{bmatrix} \eta_1(k, x_1) \\ \eta_2(k, x_2) \\ \vdots \\ \eta_M(k, x_M) \end{bmatrix} \qquad \text{Eq. 12}$$

is the transfer function vector, with "$\eta_m(k,x_m)$" describing the transfer function from the unknown signal to the measurement channel m at spatial positions $x_m$.

In Eq. 11, "$d(k,x_S)$," the overall steering vector, may be described as follows:

$$d(k, x_S) = \begin{bmatrix} d_1(k, x_1) \\ d_2(k, x_2) \\ \vdots \\ d_M(k, x_M) \end{bmatrix} \qquad \text{Eq. 13}$$

The components of $d(k,x_S)$ is the overall steering vector, whose components may be described as follows:

$$d_m(k, x_m) = \begin{bmatrix} \exp(jk \cdot x_{m1}) \\ \exp(jk \cdot x_{m2}) \\ \vdots \\ \exp(jk \cdot x_{mN_m}) \end{bmatrix} \qquad \text{Eq. 14}$$

The components of $d(k,x_S)$ are defined for each channel m for the spatial positions $x_m = \{x_{m1}, x_{m2}, \ldots x_{mN_m}\}$ that correspond to that channel. Entries of the $d(k,x_S)$ steering vector contain the phase shifts at the measurement locations.

At iteration P, if a new candidate basis function $c_p \exp(jk_p \cdot x)$ is added to the existing representation of the signal, the residual becomes the following:

$$r^P(x_S;c_P,k_P) = r^{P-1}(x_S) - c_P h(k_P, x_S) \qquad \text{Eq. 15}$$

where the parameters of the new term, i.e., $c_P$ and $k_P$ are to be determined by minimizing a metric of the residual calculated over measurement locations. One possible formulation of the optimization problem is set forth below:

$$(c_P^{OPT}, k_P^{OPT}) = \arg \min [r^P(x_S;c_P,k_P)]^H \Lambda r^P(x_S;c_P,k_P) \qquad \text{Eq. 16}$$

where the superscript "H" represents the Hermitian operator, and "$\Lambda$" represents a positive definite matrix. The role of the $\Lambda$ matrix is to weight the contributions of different measurements to the cost function to be minimized. This weighting may take into account the difference of energy content due to the different physics of the input measurements, as well account for a signal-to-noise ratio, which may vary in time, space, and frequency.

Solving the optimization problem, it can be shown that the optimal values of $c_p$ and $k_p$ satisfy the following constraint:

$$c_P^{OPT} = \frac{g(k_P^{OPT})}{\gamma(k_P^{OPT})} \qquad \text{Eq. 17}$$

where $$g(k_P) = [h(k_P, x_S)]^H \Lambda r^{P-1}(x_S) \qquad \text{Eq. 18}$$

and $$\gamma(k_P) = [h(k_P, x_S)]^H \Lambda h(k_P, x_S) \qquad \text{Eq. 19}$$

Substituting Eq. 17 into Eq. 16, provides a cost function for the optimal wavenumber vector that is described below:

$$k_P^{OPT} = \arg \max L(k_P) \qquad \text{Eq. 20}$$

where the cost function may be described as follows:

$$\mathcal{L}(k_P) = \frac{|g(k_P)|^2}{\gamma(k_P)} \qquad \text{Eq. 21}$$

In some embodiments, identifying the noise component on the at least one channel may include deriving a first channel of the plurality of channels from a vertical translational component of the seismic wavefield and a second channel of the plurality of channels from a horizontal translational component of the seismic wavefield. While vertical and horizontal translational components of the wavefield have been discussed, one or more of the plurality of channels may be derived from any component(s) of the seismic wavefield. In some embodiments, physical model(s) may relate the first and second channel and/or one or more components of the wavefield. Physical models may be applied for noise attenuation because multicomponent noise attenuation process 100 may remove the noise component and retain as much of the signal component as possible in the residual.

In some embodiments, a relationship between the first and second channel may be described by a physical model of the noise component based upon, at least in part, the ellipticity of the noise component. In some embodiments, physical models relating a vertical translational component and a horizontal translational component may be based upon ellipticity. In one example with surface waves (e.g., ground roll), the ellipticity may relate a horizontal component to a vertical component.

$$E = \left| \frac{V_x}{V_z} \right| = 2 \frac{\sqrt{1 - c^2/\beta^2}}{2 - c^2/\beta^2} \qquad \text{Eq. 22}$$

where c is the phase velocity of the surface wave and $\beta$ is the shear wave velocity at the receiver. Generally, the shear wave velocity is closely related to the phase velocity of the surface wave ($c=(0.8-0.9)*\beta$). This expression for the ellipticity is formulated for a halfspace but can be modified to account for a model with a layer over a halfspace.

In another example, the ellipticity may relate a horizontal component to a vertical component for an interface wave (i.e., Scholte waves).

$$E = \left|\frac{V_x}{V_z}\right| = \frac{1}{cq_p} \frac{\frac{1}{\beta^2} - 2\frac{1}{c^2} - 2q_p q_s}{1/\beta^2} \quad \text{Eq. 23}$$

where $q_p = \sqrt{\frac{1}{c^2} - \frac{1}{\alpha^2}}$ and $q_s = \sqrt{\frac{1}{c^2} - \frac{1}{\beta^2}}$ are the P- and S-wave vertical slownesses, respectively. In some embodiments, identifying the noise component on the at least one channel may also include deriving a first channel of the plurality of channels from the vertical translational component of the seismic wavefield and a second channel of the plurality of channels from a rotational component of the seismic wavefield. In some embodiments, one or more seismic sensor stations 212 may include one or more rotational sensors configured to measure a rotational component of a seismic wavefield. The one or more seismic stations may be positioned relative to a surface (e.g., surface 210) with an average distance of at least twenty meters between each seismic sensor station. In some embodiments, the one or more seismic sensor stations may be separated by an average distance of twenty-five meters. In some embodiments, the one or more seismic sensor stations may be separated by an average distance of fifty meters. For example, at the surface of the earth, rotations along two horizontal axes may be equal to the vertical gradient of the horizontal translational component and also to horizontal gradient of the vertical translational component (e.g., $R_x=\partial_y v_z=-\partial_z v_y$, and $R_y=\partial_x v_z=-\partial_z v_x$). Because of at least this relationship, the velocity and the direction of the noise component may be determined and/or deduced at the one or more seismic sensor stations. With the velocity and the direction of the noise component, the noise component may be reconstructed.

In some embodiments and as discussed above, identifying the noise component on the at least one channel may also include applying one or more of the physical model of the noise component and one or more spatial gradients to the one or more basis functions. As shown above, different constraints may be implemented to formulate the multichannel cost function. For example, in some embodiments, spatial gradients (e.g., true gradient and/or finite-difference gradients) may be used to formulate the multichannel cost function. In another example, one or more spatial gradients determined from the one or more seismic sensor stations may be implemented in the multichannel cost function of the matching pursuit algorithm as a transfer function (e.g., Eq. 12) relating one or more measurements to other measurements. As will be discussed in greater detail below, an amplitude decay may be used to estimate a spatial gradient of the seismic wavefield. In some embodiments, a physical model may be used to constrain the multichannel cost function. The described physical relations may be implemented in the multichannel cost function of the matching pursuit algorithm as a transfer function relating one or more measurements to other measurements.

As discussed above and referring again to FIG. 3, multicomponent noise-attenuation process 100 may compute a multichannel cost function (326) and determine/select (328) an optimum wavenumber and/or optimum wavenumber vector from the multichannel cost function. In some embodiments, the multichannel cost function may be constrained by spatial gradients and/or physical models. Multicomponent noise-attenuation process 100 may also include computing (330) a single channel cost function and determining (332) an amplitude for each channel from the single cost function. A single channel cost function may be used to compute the amplitude corresponding to the picked optimum wavenumber. In some embodiments, the single cost function may be formulated using each measurement of the seismic data separately and may be used to obtain the amplitude of the noise component. As will be discussed in greater detail below, the multichannel cost function and the single cost function may allow for the attenuation of noise on one or more input measurements that record the same noise.

In some embodiments, once the wavenumber and the amplitude of the basis function are obtained, the distinction between signal and noise components may be determined based on wavenumber filtering, a phase shift between at least two components of the wavefield, and/or exponential amplitude decay between at least two components of the wavefield. In some embodiments, the amplitude decay may be used to estimate a spatial gradient of the seismic wavefield. Identifying the noise component on the at least one channel may include wavenumber filtering. Wavenumber filtering may provide a way to distinguish between signal components and noise components on the at least one channel. Wavenumber filtering may include identifying a wavenumber bandwidth within which noise is expected to occur. Basis functions with wavenumbers within this range may be identified as noise components and subtracted from the residual. The signal components may be left in the residual. Wavenumber filtering may be valid for all input measurements.

In some embodiments, identifying the noise component on the at least one channel may include determining a phase shift between the first and second channel. For example, a phase shift between horizontal and vertical components may indicate a ground roll (e.g., surface wave). For example, there may be a phase shift between horizontal and vertical components of the ground roll as follows:

$$v_x = r_1(k,z,\omega)\exp[j(kx-\omega t)] \quad \text{Eq. 24}$$

$$v_z = jr_2(k,z,\omega)\exp[j(kx-\omega t)] \quad \text{Eq. 25}$$

By computing the cost function, the wavenumber k and the amplitude of each component, $r_1$ and $r_2$ may be determined. The imaginary component "j" may identify the ground roll (e.g., noise component) from the signal component.

In some embodiments, identifying the noise component on the at least one channel may include deriving a third channel of the plurality of channels, from a horizontal translational component of the seismic wavefield at a depth, relative to the surface, greater than the second channel, and an exponential amplitude decay between the second and third channel. In some embodiments, exponential amplitude decay of horizontal components may identify noise components on the at least one channel. For example, in the presence of a certain sensor configuration where the horizontal component of the wavefield is measured at two levels (such as, for example, different vertical levels). In some embodiments, the single channel cost function may be computed for both components and the peak may be selected to estimate the amplitude value. If the amplitude is decreasing with depth (e.g., meaning the amplitude of the sensor of seismic sensor station 233 is larger than the amplitude of the sensor of seismic sensor station), the basis function may describe a ground roll (e.g., noise component) mode rather than a signal component.

$$v_{x,top}=r_1(k,z,\omega)\exp[i(kx-\omega t)] \quad \text{Eq. 26}$$

$$v_{x,bottom}=r_1(k,z,\omega)\exp(-a\Delta z)\exp[i(kx-\omega t)] \quad \text{Eq. 27}$$

This may generally be true for the fundamental mode but not be true for complicated, higher modes. Additionally and/or alternatively, in some embodiments, the amplitude decay may be used to estimate a spatial gradient of the seismic wavefield.

In some embodiments, multicomponent noise attenuation process 100 may also include attenuating (106), the noise component on the at least one channel of the plurality of channels based upon, at least in part, the seismic data received from the one or more seismic sensor stations. In some embodiments, attenuating the noise component, may include noise reconstruction and/or signal reconstruction. Once an event (e.g., measurement within the seismic data) is picked and identified as noise, the corresponding basis function may be added to a noise component bin and subtracted from the residual. This may be repeated for each input measurement separately. If the picked event is identified as signal, the corresponding basis function may be computed and may be added to the signal component bin. In some embodiments, this may be done for each channel separately. The reconstructed basis function may be subtracted from the input measurement. In some embodiments, the reconstruction of the noise components and/or signal components may occur iteratively as each candidate basis function is optimized, as described above. When the iterations are stopped, the residual may be added to the signal component bin to generate a noise-attenuated seismic wavefield.

Figure 4:
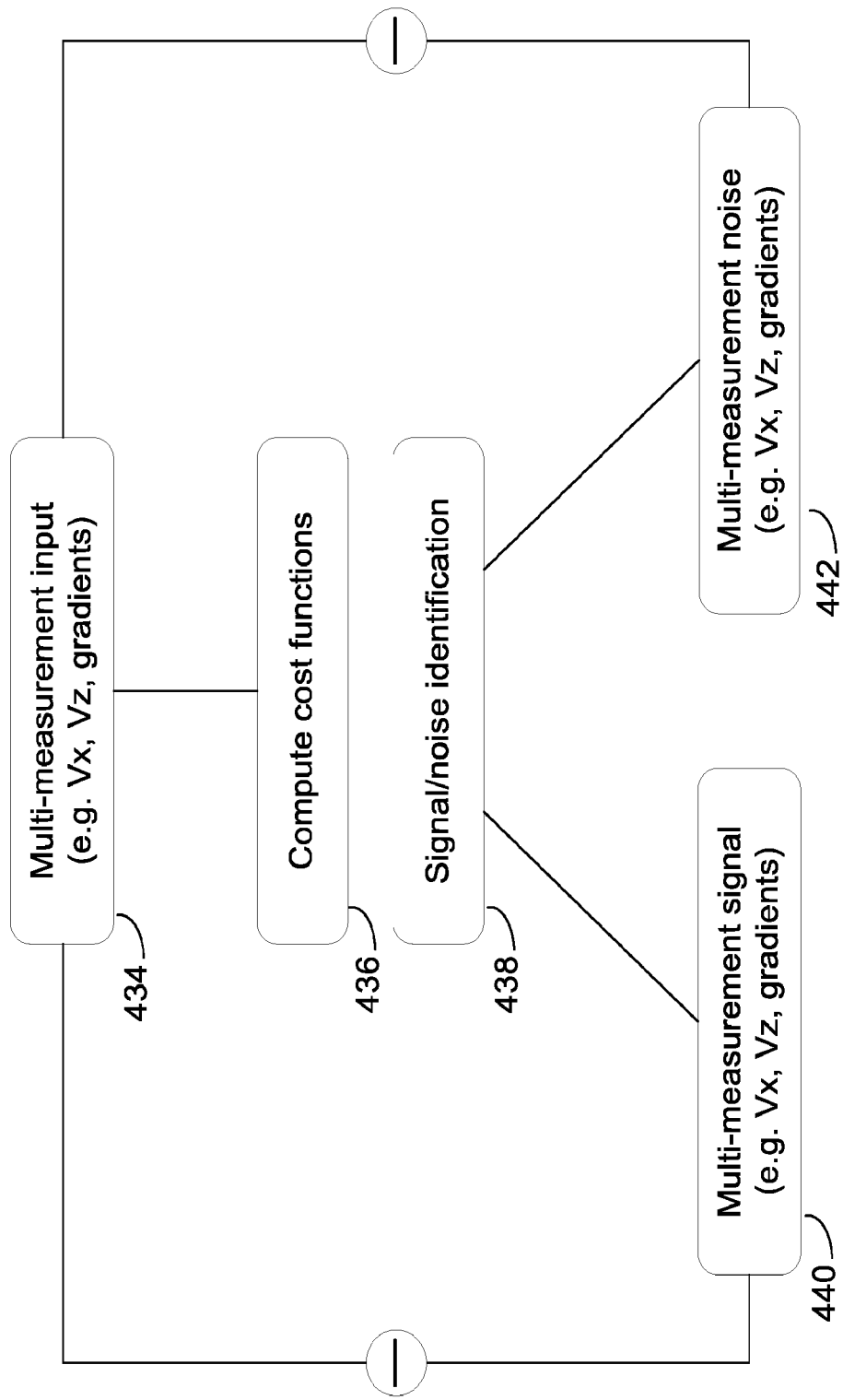

Multicomponent noise-attenuation process 400, an embodiment of which is depicted in FIG. 4, may be used to reconstruct a noise-attenuated seismic wavefield. Referring also to FIG. 4, pursuant to multicomponent noise-attenuation process 400, seismic data may be received (434) over one or more channels from a plurality of seismic sensor stations as multi-measurement and/or multicomponent input data. As discussed above, the plurality of seismic sensor stations may be disposed relative to a surface 210 and spaced with an average distance of at least twenty meters between each seismic sensor station. In one example, the plurality of seismic sensor stations may be disposed relative to a surface 210 and spaced with a distance of at least twenty-five meters between each seismic sensor station. In some embodiments, the seismic data may be recorded by a plurality of seismic receivers and may represent measurements of at least one property of the seismic wavefield. Each channel may measure a property of the seismic wavefield and/or measure a property of the seismic wavefield after the seismic wavefield has undergone a known forward transformation. Multicomponent noise attenuation process 400 may include computing (436) cost functions. These cost functions may include a multichannel cost function for determining an optimum wavenumber and/or a single cost function for determining an amplitude corresponding to the optimum wavenumber. Additionally, a single cost function may be used for determining an optimum wavenumber and a multichannel cost function may be used for determining an amplitude corresponding to the optimum wavenumber.

In some embodiments, multicomponent noise-attenuation process 400 may include identifying (438) the noise component on at least one channel and distinguishing the noise component from signal components. Signal components may be identified and the corresponding basis function may be computed and added (440) to a signal component bin. In some the signal component may be added to a signal component part of the seismic data. Noise components may be identified and the corresponding basis function may be computed and added (442) to a noise component bin. In some embodiments, the noise component may be subtracted from the residual. Multicomponent noise-attenuation process 400 may iteratively repeat until the residual is sufficiently small. In some embodiments, when the iterations are stopped, the residual may be added to the signal component part of the seismic data.

Figure 5:
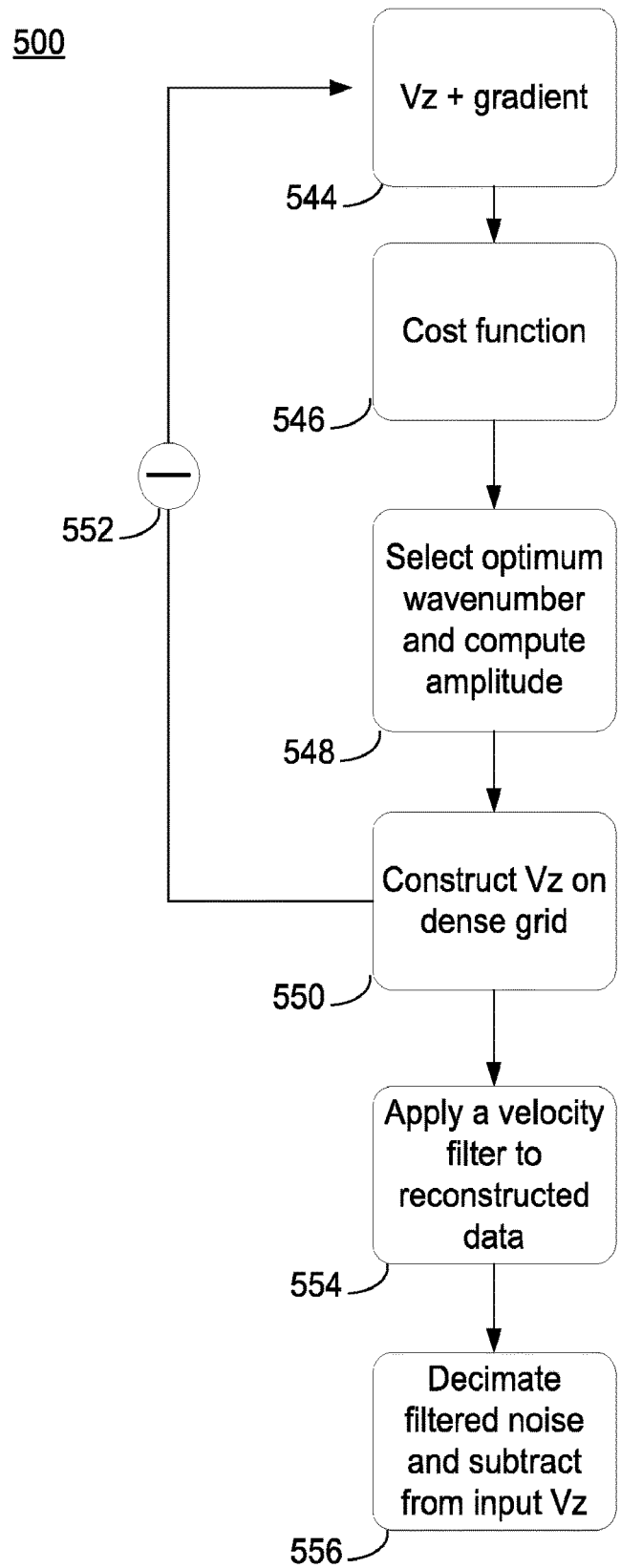
Figure 6:
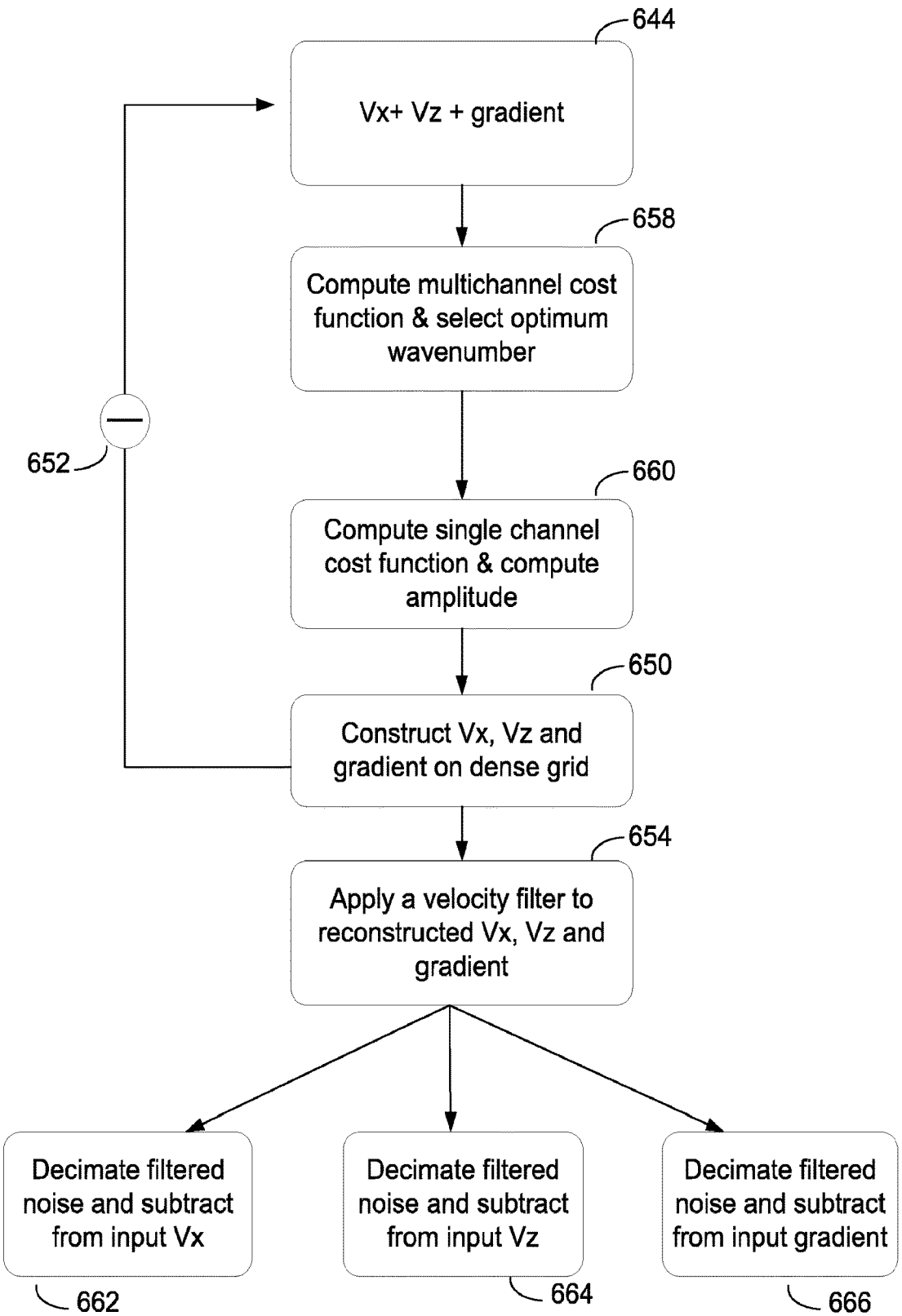

Referring also to FIGS. 5-8, three examples or workflows describing multicomponent noise-attenuation process are provided. In each example, a sensor which measures three components of the wavefield at two different positions (such as different vertical positions) may attenuate the coherent noise on the data (e.g. ground roll). Referring now to FIG. 6, the first example/workflow is based on reconstruction by the matching pursuit approach using gradients. The input seismic data may be received (544) and may include a vertical component of the wavefield measured at a sparse grid and its approximated gradient. This may include computing (546) a cost function which may combine the vertical component and the gradient. The maximum value, related to the optimum wavenumber, may be selected (548) and the corresponding basis function may be reconstructed. An amplitude for the corresponding optimum wavenumber may also be calculated. The resulting basis functions (e.g., coherent noise) may be reconstructed (550) on a dense spatial grid. The process may be repeated (552) until the energy in the input data (e.g., the residual) is minimized. Subsequently, the reconstructed data (sum of all selected basis functions) may be filtered (554) using a velocity filter resulting in a noise reference. This noise reference may be decimated (556) to the input spatial grid and may be subsequently subtracted from the input data. The output may be a noise attenuated vertical component on a sparse grid.

Referring now to FIG. 6, the described workflow in FIG. 5 may be adapted to account for multicomponent input data (e.g., $V_z$, $V_x$ and/or gradient(s)). In the example workflow of FIG. 6, the noise component(s) may be reconstructed on one or more input channels by computing (658) the multichannel cost function for wavenumber selection and computing (660) the single channel cost function for the amplitude. The seismic data may be reconstructed on a dense grid for the one or more input channels. Using any array-based filter, the noise components may be filtered from the reconstructed results. The filtered, reconstructed noise components may be decimated and subtracted (662, 664, 666) from each input channel separately.

Figure 7:
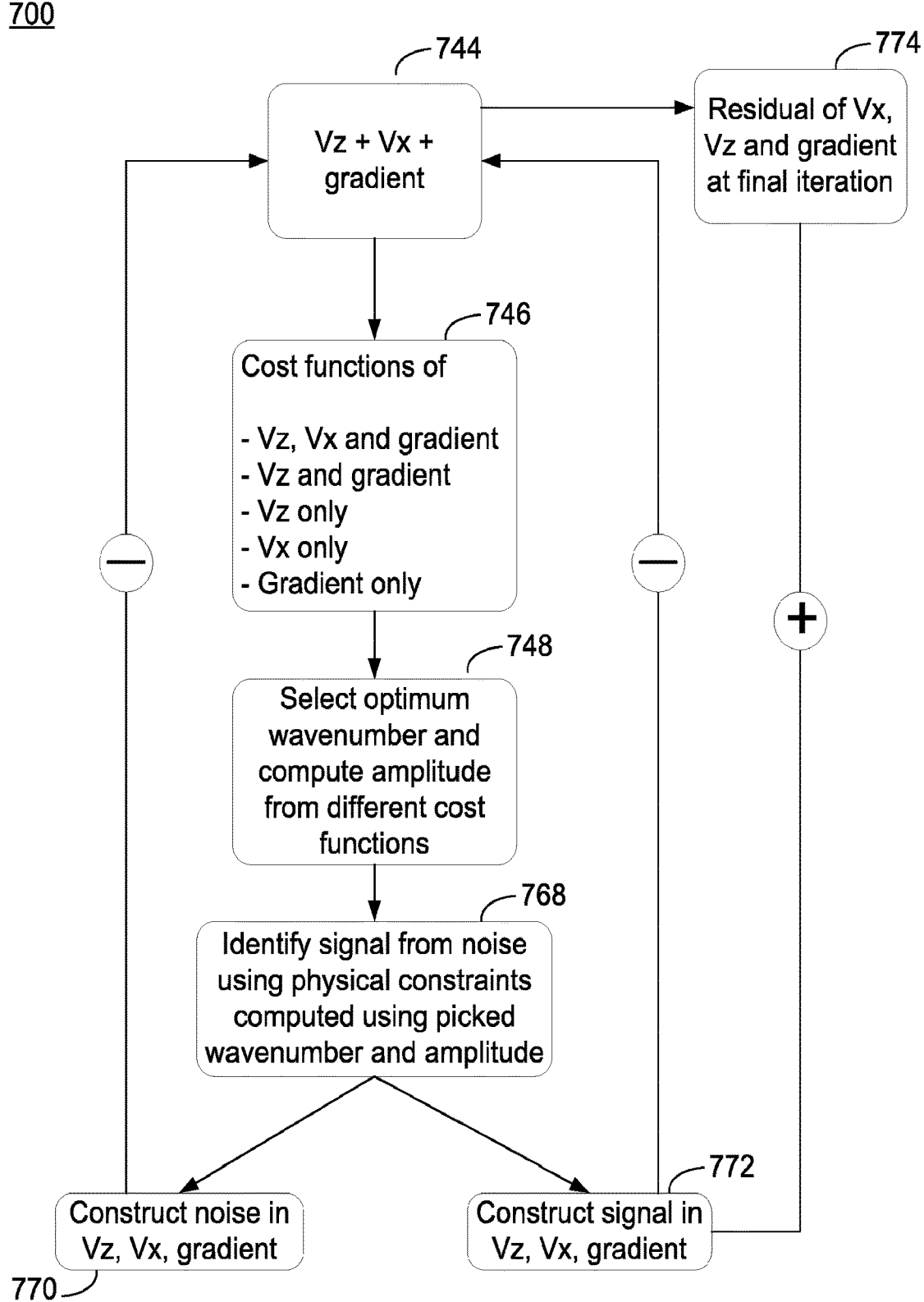

Referring now to the workflow of FIG. 7. The workflow of FIG. 7 may differ from the previous workflows in that noise components and signal components may be separated within the reconstruction algorithm. While reconstructing the seismic data to the same sparse grid using a matching pursuit approach, the amplitude and the wavenumber of each basis function (picked by selecting the maximum of the different cost functions) may also be used to identify (768) the signal components from the noise components. Once the basis function is identified as a noise component using one of the criteria described above, the basis function may be subtracted from the vertical component and the spatial gradient. In some embodiments, because the same coherent noise (e.g., noise components) may also present on the horizontal components, the complex amplitude corresponding to the same wavenumber may be selected from the cost function of each component and may be subsequently subtracted from the input measurement. With this approach, signal components (770) and noise components (772) may be constructed and separated on all input channels. In some embodiments, after the iterations are stopped, the signal components may be added (774) to the residual.

Figure 8:
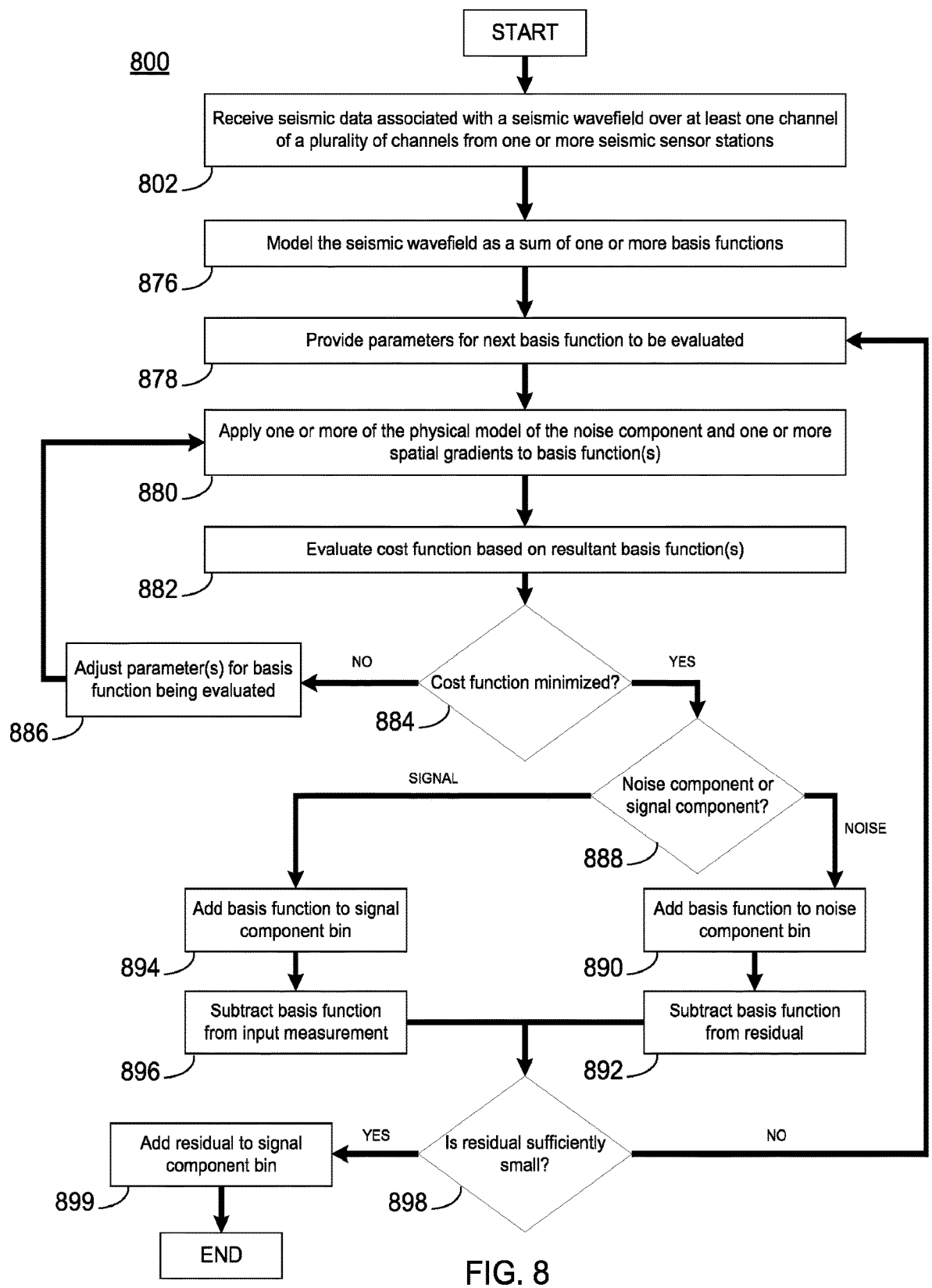

Referring also to FIG. 8, multicomponent noise-attenuation process 800 may be used to reconstruct noise-attenuated seismic wavefields, in accordance with example implementations. In some embodiments, seismic data may be received (802), and the seismic wavefield may be modeled (876) as a sum of basis functions.

Next, multicomponent noise-attenuation process 800 may begin an iterative process to determine the basis functions for the seismic wavefield. In this manner, for the example implementation depicted in FIG. 9, the basis functions may be determined one at a time. This iterative process may involve providing (878) initial parameters for the next basis function; applying (880) forward transformations (linear filters, physical models, physical constraints, spatial gradients, etc.) to the basis functions and based on the resultant basis function(s), evaluating (882) a cost function. If it is determined (884) that the multichannel cost function has not been minimized, one or more parameters for the basis function may be adjusted (886) and control returns to applying additional constraints and/or transformations (880).

Otherwise, if the multichannel cost function is minimized, it may be determined (888) if the basis function is a noise component or a signal component. If it is determined that the basis function is a noise component, the basis function may be added (890) to the current summation of basis functions already determined as noise components (e.g., a noise component bin) and the basis function may be subtracted (892) from the residual. If it is determined that the basis function is a signal component, the basis function may be added (894) to the current summation of basis functions already determined as signal components (e.g., a signal component bin) and the basis function may be subtracted (896) from the input measurement. If a determination is made (898) that the residual is sufficiently small, then residual may be added (899) to the signal component bin and the process may end. Otherwise, control may return to providing (878) initial parameters for the next basis function.

Figure 9:
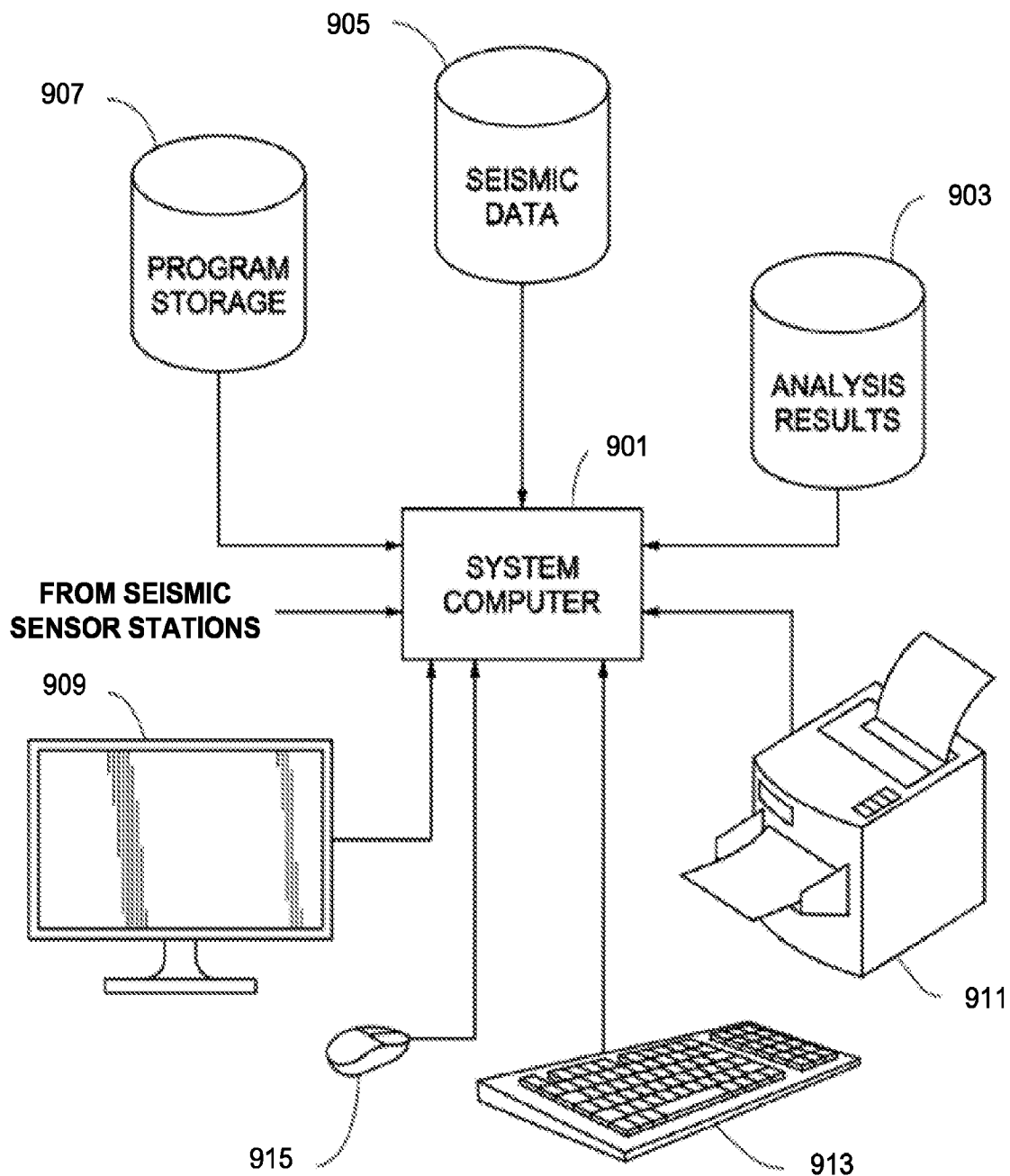
FIG. 9 illustrates a computing system in accordance with implementations of various techniques described herein.

FIG. 9 illustrates a computing system 900 that may be used in connection with various implementations described herein that may be implemented. The computing system 900 (system computer) may include one or more system computers 901, which may be implemented as any conventional computer or server. However, those skilled in the art will appreciate that implementations of various techniques described herein may be practiced in other computer system configurations, including hypertext transfer protocol (HTTP) servers, hand-held devices, multiprocessor systems, microprocessor-based or programmable consumer electronics, network PCs, minicomputers, mainframe computers, and the like.

The system computer 901 may be in communication with disk storage devices 903, 905, and 907, which may be external hard disk storage devices. It is contemplated that disk storage devices 903, 905, and 907 are conventional hard disk drives, and as such, will be implemented by way of a local area network or by remote access. Of course, while disk storage devices 903, 905, and 907 are illustrated as separate devices, a single disk storage device may be used to store any and all of the program instructions, measurement data, and results as desired.

In some implementations, seismic data from the sensors may be stored in disk storage device 905. The system computer 901 may retrieve the appropriate data from the disk storage device 905 to process seismic data according to program instructions that correspond to implementations of various techniques described herein. The program instructions may be written in a computer programming language, such as $C^{++}$, Java and the like. The program instructions may be stored in a computer-readable medium, such as program disk storage device 907. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 901. Communication media may embody computer readable instructions, data structures or other program modules. By way of example, and not limitation, communication media may include wired media such as a wired network or direct-wired connection, and wireless media such as acoustic, radio frequency (RF), infrared (IR), and various other wireless media. Further, combinations of any of the above may also be included within the scope of computer readable media.

In some implementations, the system computer 901 may provide output primarily onto graphics display 909, or via printer 911. The system computer 901 may store the results of the methods described above on disk storage 903, for later use and further analysis. Further, the keyboard 913 and/or the pointing device 915 (e.g., a mouse, trackball, or the like) may be provided with the system computer 901 to enable interactive operation.

The system computer 901 may be located at a data center remote from the survey region. The system computer 901 may be in communication with the receivers (either directly or via a recording unit, not shown), to receive signals indicative of the reflected seismic energy. These signals, after conventional formatting and other initial processing, may be stored by the system computer 901 as digital data in the disk storage 905 for subsequent retrieval and processing in the manner described above. In one implementation, these signals and data may be sent to the system computer 901 directly from seismic sensor stations 212, such as geophones, hydrophones, and the like. When receiving data directly from seismic sensor stations 212, the system computer 901 may be described as part of an in-field data processing system. In another implementation, the system computer 901 may process seismic data already stored in the disk storage 905. When processing data stored in the disk storage 905, the system computer 901 may be described as part of a remote data processing center, separate from data acquisition. The system computer 901 may be configured to process data as part of the in-field data processing system (e.g., data acquisition system 218), the remote data processing system or a combination thereof.

While FIG. 10 may illustrate that the disk storage 905 as directly connected to the system computer 901, it is also contemplated that the disk storage device 905 may be accessible through a local area network or by remote access. Further, while disk storage devices 903, 905 are illustrated as separate devices for storing input seismic data and analysis results, the disk storage devices 903, 905 may be implemented within a single disk drive (either together with or separately from program disk storage device 907), or in any other conventional manner as will be fully understood by one of skill in the art having reference to this specification.

The flowchart and block diagrams in the figures illustrate the architecture, functionality, and operation of possible implementations of systems and methods and according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As used in any embodiment described herein, the term "circuitry" may comprise, for example, singly or in any combination, hardwired circuitry, programmable circuitry, state machine circuitry, and/or firmware that stores instructions executed by programmable circuitry. It should be understood at the outset that any of the operations and/or operative components described in any embodiment or embodiment herein may be implemented in software, firmware, hardwired circuitry and/or any combination thereof.

The terminology used herein is for the purpose of describing particular embodiments and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the scope of the present disclosure, described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

Having thus described the disclosure of the present application in detail and by reference to embodiments thereof, it will be apparent that modifications and variations are possible without departing from the scope of the disclosure defined in the appended claims.

What is claimed is:

1. A seismic survey spread, comprising:
a plurality of multicomponent seismic sensors proximate to earth surface, each of the multicomponent seismic sensors being capable of measuring rotation, wherein the spacing between each adjacent multicomponent seismic sensor pair is at least twenty meters, wherein the plurality of multicomponent seismic sensors is configured to acquire seismic data associated with a seismic wavefield, wherein at least one processor of a computing device is configured to:
receive the seismic data over a plurality of channels from the plurality of multicomponent seismic sensors;
derive a first channel of the plurality of channels from a vertical translational component of the seismic wavefield and a second channel of the plurality of channels from a horizontal translational component of the seismic wavefield;
identify a noise component on the first channel or second channel by modeling the seismic wavefield as a sum of one or more basis functions and determining an optimum wavenumber and an amplitude from one or more of a multichannel cost function and a single channel cost function;
attenuate the noise component on the the first channel or second channel based upon, at least in part, the seismic data.

2. The seismic survey spread of claim 1, wherein the multicomponent seismic sensors comprise two linear sensors that are spaced apart from one another in a direction that is substantially perpendicular to the earth surface, so that ground roll is evidenced by differencing linear signals detected at the two linear sensors.

3. The seismic survey spread of claim 1, wherein the multicomponent seismic sensors comprise at least two rotation sensors that are configured substantially orthogonal to one another.

4. A system comprising a computing device having at least one processor configured to receive seismic data associated with a seismic wavefield over at least one channel of a plurality of channels from one or more seismic sensor stations, wherein the one or more seismic sensor stations are disposed relative to a surface with an distance of at least twenty meters between each of the adjacent one or more seismic sensor stations, the at least one processor further configured to identify a noise component on the at least one channel of the plurality of channels by modeling the seismic wavefield as a sum of one or more basis functions and determining an optimum wavenumber and an amplitude from one or more of a multichannel cost function and a single channel cost function, and the at least one processor further configured to attenuate the noise component on the at least one channel of the plurality of channels based upon, at least in part, the seismic data received from the one or more seismic sensor stations.

5. The system of claim 4, the at least one processor is further configured to derive a first channel of the plurality of channels from a vertical translational component of the seismic wavefield and a second channel of the plurality of channels from a horizontal translational component of the seismic wavefield.

6. The system of claim 5, wherein a relationship between the first and second channel is described by a physical model of the noise component based upon, at least in part, an ellipticity of the noise component.

7. The system of claim 6, wherein the at least one processor is further configured to apply one or more of the physical model of the noise component and one or more spatial gradients to the one or more basis functions.

8. The system of claim 5, wherein the at least one processor is further configured to determine a phase shift between the first and second channel.

9. The system of claim 5, wherein the at least one processor is further configured to derive a third channel of the plurality of channels, from a horizontal translational component of the seismic wavefield at a depth, relative to the surface, greater than the second channel, and an exponential amplitude decay between the second and third channel.

10. The system of claim 9, wherein the at least one processor is further configured to estimate a spatial gradient of the seismic wavefield based upon, at least in part, the exponential amplitude decay.

11. The system of claim 4, wherein the at least one processor is further configured to derive a first channel of the plurality of channels from the vertical translational component of the seismic wavefield and a second channel of the plurality of channels from a rotational component of the seismic wavefield.

12. A method for multicomponent noise attenuation of a seismic wavefield comprising:
receiving, at one or more computing devices, seismic data associated with a seismic wavefield over at least one channel of a plurality of channels from one or more seismic sensor stations, wherein the one or more seismic sensor stations are disposed relative to a surface with an distance of at least twenty meters between each of the adjacent one or more seismic sensor stations;
identifying a noise component on the at least one channel of the plurality of channels by modeling the seismic wavefield as a sum of one or more basis functions and determining an optimum wavenumber and an amplitude from one or more of a multichannel cost function and a single channel cost function; and
attenuating the noise component on the at least one channel of the plurality of channels based upon, at least in part, the seismic data received from the one or more seismic sensor stations.

13. The method of claim 12, wherein identifying the noise component on the at least one channel includes deriving a first channel of the plurality of channels from a vertical translational component of the seismic wavefield and a second channel of the plurality of channels from a horizontal translational component of the seismic wavefield.

14. The method of claim 13, wherein a relationship between the first and second channel is described by a physical model of the noise component based upon, at least in part, an ellipticity of the noise component.

15. The method of claim 14, wherein identifying the noise component on the at least one channel includes applying one or more of the physical model of the noise component and one or more spatial gradients to the one or more basis functions.

16. The method of claim 13, wherein identifying the noise component on the at least one channel includes determining a phase shift between the first and second channel.

17. The method of claim 13, wherein identifying the noise component on the at least one channel includes deriving a third channel of the plurality of channels, from a horizontal translational component of the seismic wavefield at a depth, relative to the surface, greater than the second channel, and an exponential amplitude decay between the second and third channel.

18. The method of claim 12, wherein identifying the noise component on the at least one channel includes deriving a first channel of the plurality of channels from the vertical translational component of the seismic wavefield and a second channel of the plurality of channels from a rotational component of the seismic wavefield.

19. A system comprising a computing device having at least one processor configured to receive seismic data associated with a seismic wavefield over at least one channel of a plurality of channels from one or more seismic sensor stations, wherein the one or more seismic sensor stations are disposed relative to a surface with a distance of at least twenty meters between each of the one or more adjacent seismic sensor stations, the at least one processor further configured to identify a noise component on the at least one channel of the plurality of channels by modeling the seismic wavefield as a sum of one or more basis functions and deriving a first channel of the plurality of channels from a vertical translational component of the seismic wavefield and a second channel of the plurality of channels from a horizontal translational component of the seismic wavefield, wherein a relationship between the first and second channel is described by a physical model of the noise component based upon, at least in part, an ellipticity of the noise component, and the at least one processor further configured to attenuate the noise component on the at least one channel of the plurality of channels based upon, at least in part, the seismic data received from the one or more seismic sensor stations.

* * * * *